United States Patent
Tulshan et al.

(10) Patent No.: US 11,822,562 B2
(45) Date of Patent: Nov. 21, 2023

(54) UNSTRUCTURED TEXT PROCESSING FOR GEOGRAPHICAL LOCATION DETERMINATION SYSTEM

(71) Applicant: Capital One Services, LLC, McLean, VA (US)

(72) Inventors: Lokesh S. Tulshan, Bangalore (IN); Deepthi Uppalapati, Dallas, TX (US); Anirban Majumdar, Bangalore (IN); Daniel Pereira, Little Elm, TX (US); Manish R. Chhabra, Frisco, TX (US); Kukumina Pradhan, Bangalore (IN); Kuldeep Kashinath Marganache, Frisco, TX (US); Raghavendra Chivukula, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 42 days.

(21) Appl. No.: 17/709,844

(22) Filed: Mar. 31, 2022

(65) Prior Publication Data
US 2023/0315743 A1    Oct. 5, 2023

(51) Int. Cl.
*G06F 16/00*       (2019.01)
*G06F 16/2457*   (2019.01)
(Continued)

(52) U.S. Cl.
CPC ........ *G06F 16/24578* (2019.01); *G06F 16/29* (2019.01); *G06F 40/40* (2020.01)

(58) Field of Classification Search
CPC ..... G06F 16/24578; G06F 16/29; G06F 40/40
See application file for complete search history.

(56) References Cited

U.S. PATENT DOCUMENTS

| | | | | |
|---|---|---|---|---|
| 7,640,209 B1* | 12/2009 | Brooks | .................. | G06Q 40/02 |
| | | | | 705/38 |
| 8,750,898 B2* | 6/2014 | Haney | .................. | H04L 67/535 |
| | | | | 455/456.3 |

(Continued)

OTHER PUBLICATIONS

Yuan, X.; Chang, et al., Sequential Pattern Mining Algorithm Based on Text Data: Taking the Fault Text Records as an Example. Sustainability 2018, 10, 4330. <https://doi.org/10.3390/su10114330>.

(Continued)

*Primary Examiner* — Noosha Arjomandi
(74) *Attorney, Agent, or Firm* — Banner & Witcoff, Ltd.

(57) ABSTRACT

Aspects described herein include systems and methods for determining addresses for assets, prioritizing the addresses for inspection by users, and applying natural language processing techniques to unstructured text input by the users. According to some aspects, a message may be received that includes unstructured text that was input by a user. The unstructured text may be associated with an inspection, by the user, of an address for an asset. One or more natural language techniques may be applied to the unstructured text to, among other things, facilitate the determination and sending of a response message to the unstructured text in an automated fashion. The response message may, if the asset was not found, include another address as a suggestion for the user to inspect for the asset. This suggested address may be determined based on changes to address priority that were caused by processing of the unstructured text.

20 Claims, 14 Drawing Sheets

(51) Int. Cl.
*G06F 40/40* (2020.01)
*G06F 16/29* (2019.01)

(56) References Cited

U.S. PATENT DOCUMENTS

| | | | | |
|---|---|---|---|---|
| 9,443,192 | B1* | 9/2016 | Cosic | G06N 5/048 |
| 9,672,252 | B2* | 6/2017 | Landry | G06F 11/0793 |
| 9,842,120 | B1* | 12/2017 | Siris | H04W 4/029 |
| 10,447,620 | B2 | 10/2019 | Bueker et al. | |
| 10,504,081 | B1 | 12/2019 | Han et al. | |
| 10,505,825 | B1* | 12/2019 | Bettaiah | G06F 16/285 |
| 10,530,723 | B2 | 1/2020 | Milligan et al. | |
| 11,210,300 | B2* | 12/2021 | Ignatyev | G06Q 10/00 |
| 11,250,216 | B2 | 2/2022 | Demme et al. | |
| 11,281,680 | B2 | 3/2022 | Agarwalla et al. | |
| 11,567,948 | B2* | 1/2023 | Bar-on | G06F 16/248 |
| 2010/0188245 | A1* | 7/2010 | Nielsen | G01V 3/15 |
| | | | | 340/686.1 |
| 2011/0191058 | A1* | 8/2011 | Nielsen | G01C 15/02 |
| | | | | 702/141 |
| 2014/0066044 | A1* | 3/2014 | Ramnani | H04L 67/306 |
| | | | | 455/418 |
| 2014/0229102 | A1* | 8/2014 | Bapna | G06Q 10/025 |
| | | | | 701/491 |
| 2016/0321513 | A1* | 11/2016 | Mitti | G06V 20/63 |
| 2018/0357289 | A1* | 12/2018 | Wittke | G06F 16/285 |
| 2019/0075097 | A1* | 3/2019 | Campbell | H04L 63/12 |
| 2020/0210442 | A1* | 7/2020 | Bergeron | G06N 20/00 |
| 2022/0107968 | A1* | 4/2022 | Wang | G06F 16/29 |
| 2022/0391384 | A1* | 12/2022 | Detwiler | G06F 16/29 |
| 2022/0391402 | A1* | 12/2022 | Warnaar | G06F 16/9035 |
| 2022/0397400 | A1* | 12/2022 | Adegbenro | G06F 16/587 |

OTHER PUBLICATIONS

Maylawati, D.S., et al., An idea based on sequential pattern mining and deep learning for text summarization, J. Phys.: Conf. Ser., 1402 (2019) 077013. <https://doi.org/10.1088/1742-6596/1402/7/077013>.

Co-pending U.S. Appl. No. 17/342,001, filed Jun. 8, 2021, entitled Geographical Location Determination System, Lindsay Detwiler et al.

* cited by examiner

UNSTRUCTURED TEXT PROCESSING FOR GEOGRAPHICAL LOCATION DETERMINATION SYSTEM

BACKGROUND

Determining accurate geographical location information (e.g., street addresses) for individuals, assets, or businesses is frequently a difficult and labor-intensive task. But accurate geographical information is required for a number of applications including insurance, theft prevention, auditing, inventory management, debt collection, etc. Previous data systems have had problems accurately determining the correct geographical locations due to conflicting multiple addresses, out of date contact information, or simply inaccurate contact information, to name a few non-limiting examples. It is, therefore, sometimes necessary to verify geographical location information for specific applications including, for example, to determine if an asset is physically located at a location.

In the past, verifying geographical location information required the employ of, or contracting with, multiple sets of people. The first set of people would physically verify the accuracy of geographical location information by, for example, traveling to the designated location, determining whether an asset was physically located there, and providing results of the determination to a second set of people. This second set of people may, if the asset was not physically located, provide additional geographical location information to the first set of people. This method is costly and time consuming. Indeed, from the time the results are provided from the first set of people, it may take the second set of people over half a week to provide the additional geographical location information. Thus, methods that reduce or eliminate the need for human action while still accurately verifying geographical location information are needed.

SUMMARY

The following summary presents a simplified summary of certain features. The summary is not an extensive overview and is not intended to identify key or critical elements.

Aspects described herein include systems and methods for determining addresses for assets, prioritizing the addresses for inspection by users, and for applying natural language processing techniques to unstructured text input by the users. According to some aspects, a message may be received that includes unstructured text that was input by a user. The unstructured text may be associated with an inspection, by the user, of an address for an asset. One or more natural language techniques may be applied to the unstructured text to, among other things, facilitate the determination and sending of a response message to the unstructured text in an automated fashion. The response message may, if the asset was not found, include another address as a suggestion for the user to inspect for the asset. This suggested address may be determined based on changes to address priority that were caused by processing of the unstructured text.

In some aspects, one or more computing devices may receive a message that includes unstructured text. The first unstructured text may have been input by a user and may be associated with an inspection, by the user, of a first address for an asset. Based on applying one or more natural language processing techniques to the unstructured text, the one or more computing devices may determine one or more categories for the first unstructured text. Based on the one or more categories for the first unstructured text, the one or more computing devices, may perform a category-based response process. The category-based response process may include customized steps for processing unstructured text of the determined one or more categories.

In some aspects, the category-based response process may include, based on applying one or more pattern mining techniques to the unstructured text, determining address data that indicates the first address and inspection result data that indicates one or more results of the inspection of the first address. The category-based response process may include, based on the inspection result data, determining that the first asset was not found at the first address. The category-based response process may include, based on the address data and the inspection result data, modifying address priority data that indicates a prioritized order for conducting inspections of addresses to locate the first asset. This modifying may cause the first address to be deprioritized in the prioritized order of the addresses. The category-based response process may include determining a response message that indicates, based on the address priority data, a second address at which the user is suggested to conduct an inspection for the asset. The category-based response process may include sending the response message to a device associated with the user.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
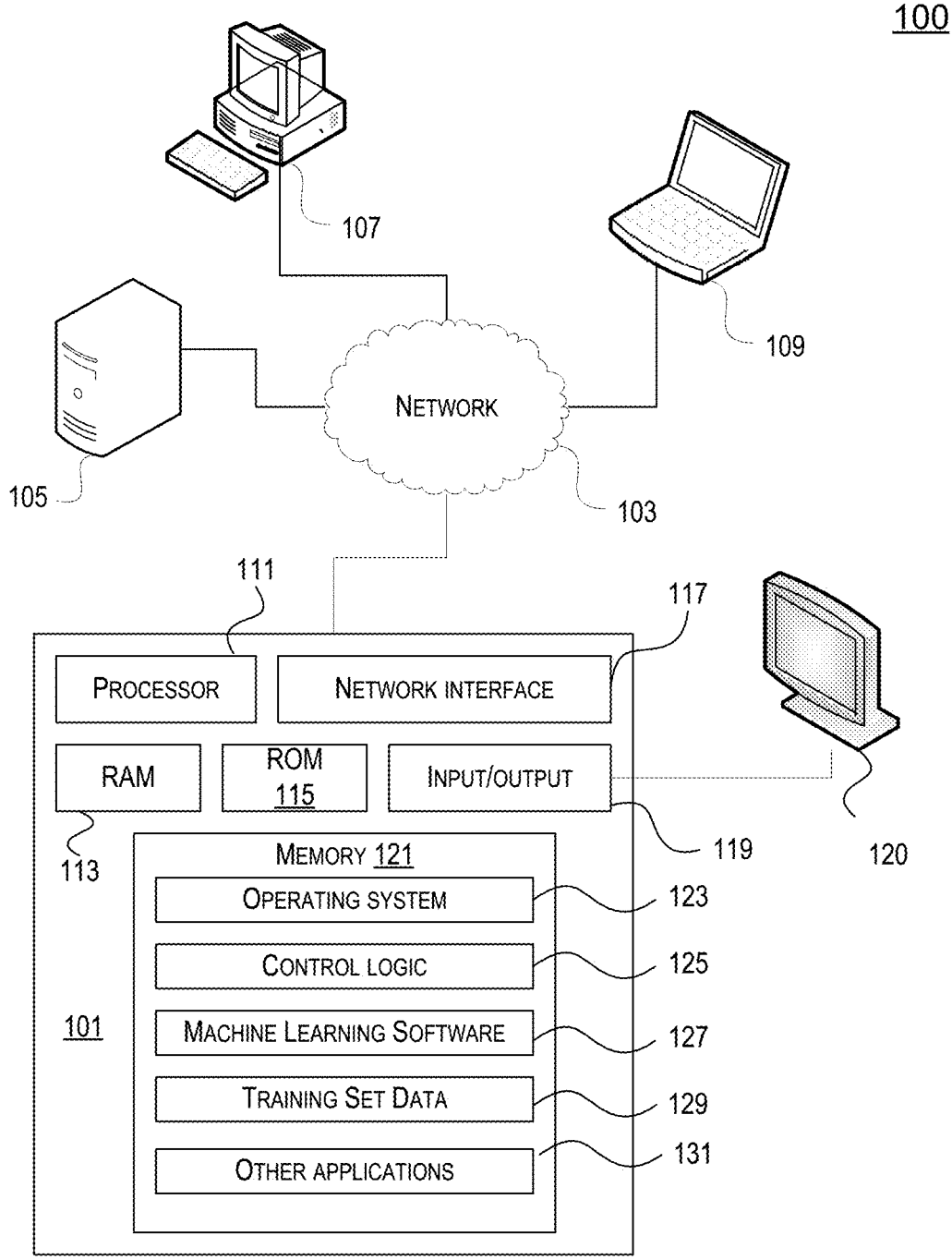
FIG. 1 is diagram of a system that can be used to implement various components described in the disclosure.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques that allow for improved automation and back-end prioritization of geographical location information such as street addresses or other physical addresses. In this way, more efficient systems and methods for verifying geographical location information can be implemented.

In the past, verifying geographical location information required significant expenditure of human capital. For example, verifying customer contact or address information may have required people to physically verify a geographical location's accuracy by traveling to the geographical location, determine whether an asset was physically located there, and provide results to a back-end system staffed by additional people. The people staffing the back-end system may prepare and send a response to the received results, such as a response that provides a new address if the asset was not physically located at the geographical location. This method is costly and time consuming. The present disclosure describes ways to leverage a digital activity footprint of a customer (e.g., electronic records relating to credit/debit card transactions, online purchases, etc.) and to apply, among other things, natural language processing to the received results as part of a process to automate responses in order to increase the efficiency. This information can be used to prioritize geographical location information that is more likely to be accurate for locating the asset because it is, for example, recent, from a trusted source, or of a type that is likely to be highly accurate. In other words, unlike past solutions, the processes and devices of the present disclosure take advantage of significant electronic data available about customers associated with an asset as well as results of inspections performed by people for the asset. Based on that significant data, the processes and devices of the present disclosure may quickly and/or in an automated fashion determine which of a number of geographical locations is likely to be accurate so that time and efforts need not be wasted attempting to verify unlikely addresses.

For simplicity, a geographical location may be any physical location that can be visited to inspect, search, or otherwise identify, the physical presence of an asset such as a vehicle. Examples used throughout this disclosure of geographical locations may include physical addresses, street addresses, addresses, customer contacts, customer address information, and the like. Further, according to some examples discussed throughout this disclosure, geographical locations may be stored, in a digital form, as address records, records, one or more compilations of address records, one or more compilations of records, one or more address compilations, and/or one or more record compilations. Additionally, a customer may be a person that is being or has been provided service (e.g., a bank account, a credit account, a loan account) by an entity or organization; may be a borrower for purchasing as asset (e.g., a vehicle) and the funds for the purchase may have been loaned by the entity or organization (e.g., a lender or bank); or the like. In this way, a customer, in some specific examples described throughout this disclosure, may be interchangeably referred to as a borrower, but a lender-borrower (lender-lendee) relationship is not required by all embodiments.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

Figure 2:
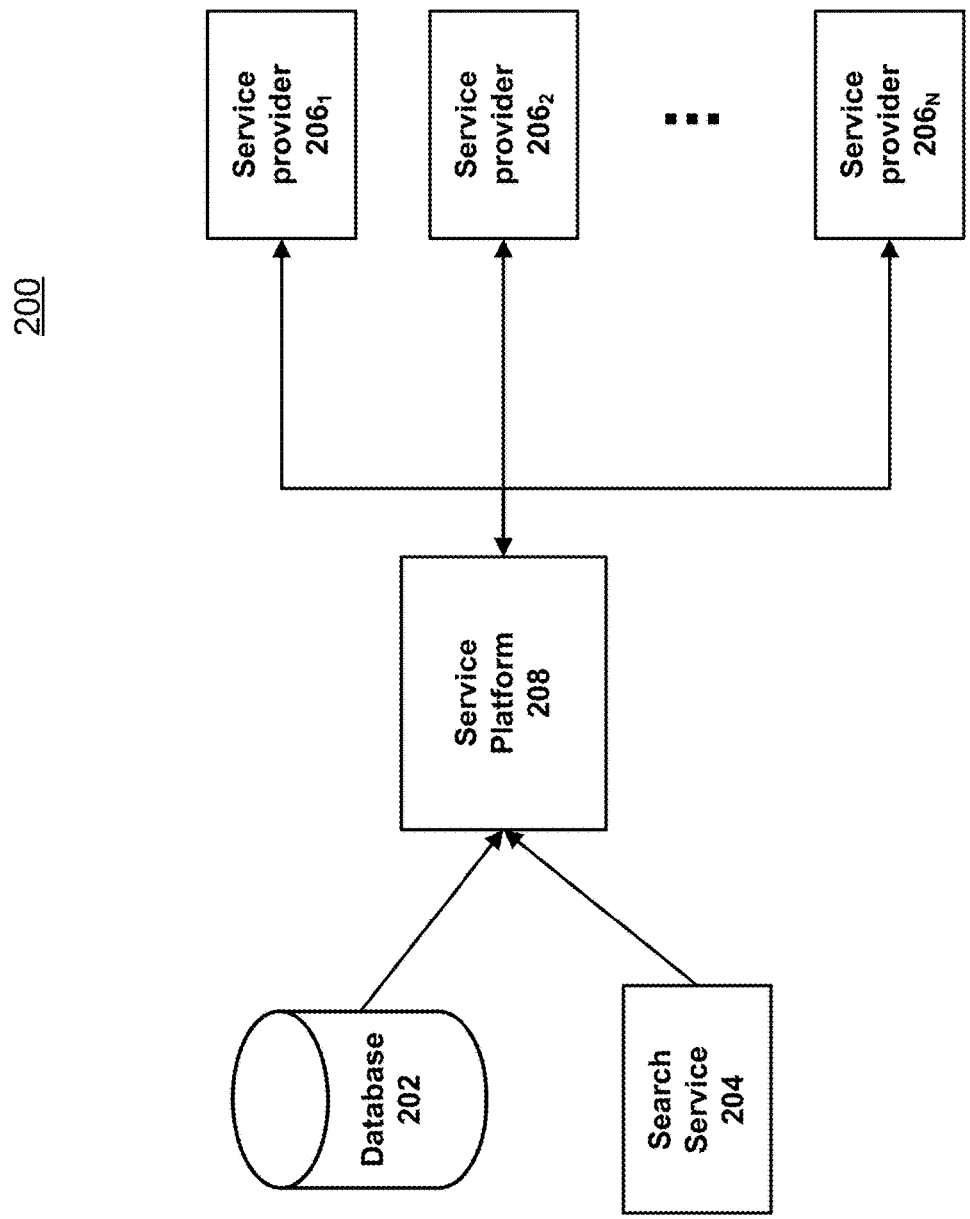
FIG. 2 is a functional block diagram of a system in accordance with various aspects of the disclosure.

FIG. 2 is a functional block diagram depicting system 200 that can be used to implement several aspects of the current disclosure. As shown in FIG. 2, system 200 includes a service platform 208, which may be communicatively coupled to database 202 and/or search service 204. According to some aspects, database 202 may contain customer or borrower data relating to a number of assets. For example, the database 202 may contain borrower information (e.g., home address, business address, telephone number, co-signer information, historical address information, to name a few non-limiting examples). Database 202 may also contain information relating to any accounts also associated with the borrower such as debit/credit card address information, addresses where credit/debit cards have been used, skip tracing notes from prior investigations, to name a few examples. That is, particularly, when the database 202 is operated by a lender and/or bank, it may contain a complete digital activity footprint that includes details like digital transaction data, the addresses/locations of frequented businesses, credit application information, historical transaction data, to name a few non-limiting examples. Additionally, in some instances this digital activity footprint information may contain more granular data. For example, it may be able to identify where a particular asset (for example, vehicle such as an automobile) is serviced regularly, the frequency of that service, which garage and/or gas station (continuing with the automobile example) the user prefers to use, and the frequency of that service based on the credit/debit card information and digital transaction data. Importantly, such digital activity footprint information may be used to corroborate and/or suggest which of several address records are more likely than not to be accurate—i.e., if a user frequently uses a gas station that is located near one of the residential address records for a user/asset, then it might be reasonable to conclude that the residential address record contains an accurate address for that user/asset's home address.

In some examples, search services may be used to confirm information in database 202 or to retrieve information not contained in database 202. Search services may be used to, for example, query information relating to the borrower associated with an asset including credit bureau files, motor vehicle registration information, driver's license information, the address of relatives, voter registration, police reports, addresses of past vehicle servicing history, and license plate recognition data, to name a few non-limiting examples. While FIG. 2 only depicts a single database 202 and a single search service 204, it should be understood that the service platform 208 may be communicatively coupled to several databases 202 and several search services 204 while remaining within the intent and spirit of the disclosure.

Service platform 208, which may be implemented (for example) using some or all components of system 100 shown in FIG. 1, may also be communicatively coupled to one or more service providers 206$_1$, 206$_2$, . . . 206$_N$ (herein collectively referred to as "service providers 206"). Using information acquired from databases 202 and search services 204, service platform 208 may generate a list or subset of possible addresses associated with an asset. This list or subset of possible addresses can then be sent to one or more service providers 206 in order for the service providers to take appropriate action. For example, service providers 206 may be used to confirm a probable address or that an asset is actually located at an address on file.

To better explain the function of system 200, consider a case where a lender (employing system 200) needs to know the physical location of a vehicle that is subject to a loan. The system 200, using service platform 208, may query the lender's database (e.g., database 202), which may contain a number of different physical addresses for the borrower. For example, it might contain her home address at the time she initiated the loan, her work address at the time she initiated the loan, address information related to any cosigners of the loan, etc. The lender, using service platform 208, may request this data from database 202. To supplement database 202 information, the lender may also query one or more search services 204 to receive credit bureau files, motor vehicle registration information, driver's license information, the address of relatives, voter registration, police reports, addresses of past vehicle servicing history, and license plate recognition data, etc. From all of the queried address information, service platform 208 may compile a number of different addresses into an address compilation associated with the automobile in question. Such an address compilation might look like record 302, as shown in FIG. 3.

Figure 3:
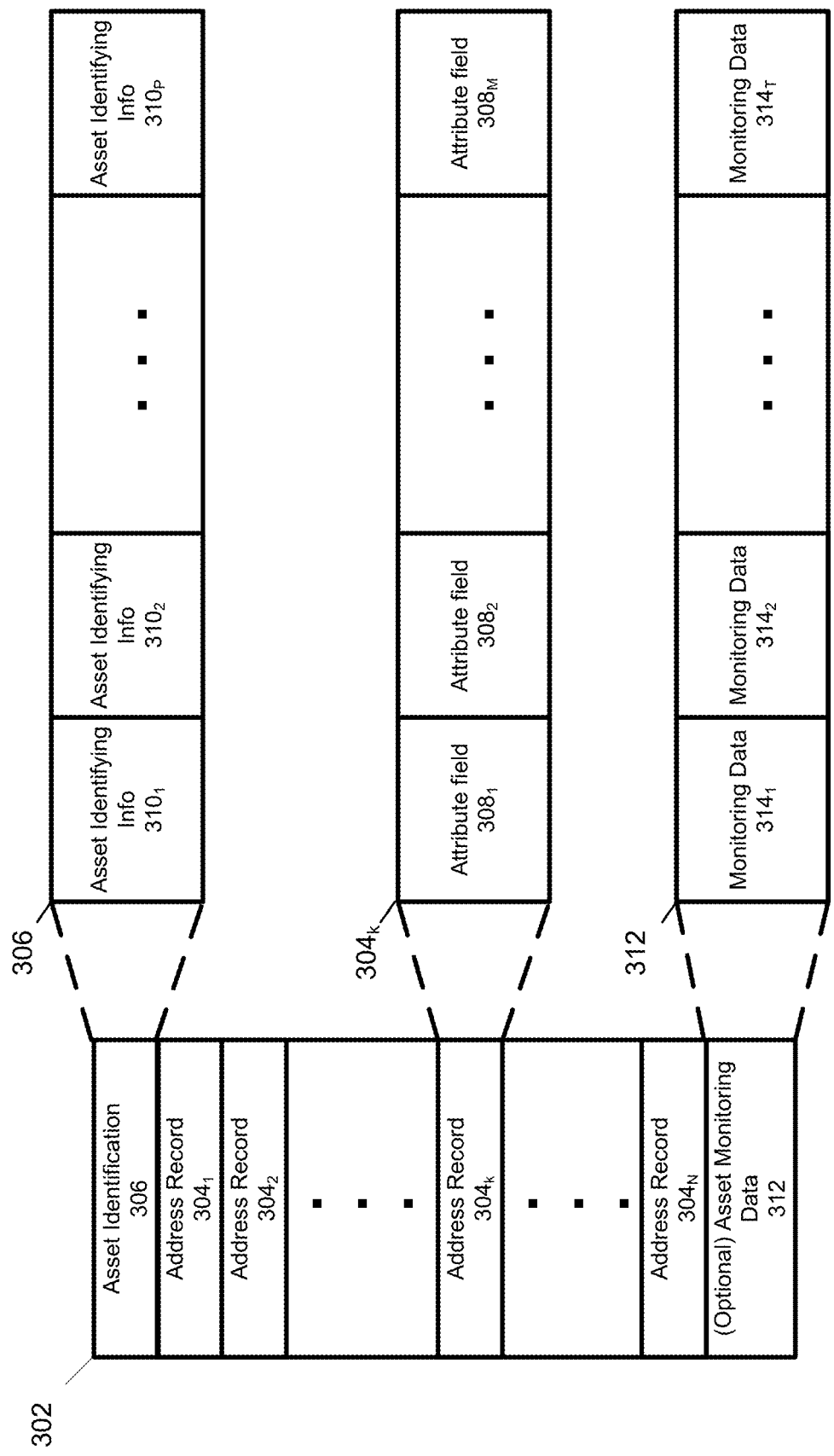
FIG. 3 represents a data structure that can be used in conjunction with various aspects of the disclosure.

FIG. 3 conceptually depicts an address compilation 302 according to various aspects of the disclosure. Compiled addresses 302 may include a number of different address records 304$_1$, 304$_2$, . . . , 304$_k$, . . . , 304$_N$ (collectively referred to herein as "address records 304"). Further, each address record 304 may contain several fields, e.g., 308$_1$, 308$_2$, . . . , 308$_M$ (collectively "attributes 308") and the fields may contain attributes of the address record. As discussed above, attributes may include a recency of the address record (i.e., how old the record is), a source (e.g., application records, search service provider, credit report, etc.), a date, identifying information for the asset (e.g., license plate data, car make/model, color, etc.), or address type (e.g., business, residential, apartment, etc.), to name several non-limiting examples.

As further depicted in FIG. 3, the address compilation 302 may optionally include asset identification data 306. The asset identification data 306 may include various fields 310$_1$, 310$_2$, . . . , 310$_P$, with each field including identifying information for the asset (e.g., license plate data, vehicle make/model, color, vehicle identification number (VIN), etc.). Asset identification data 306 may serve to associate the address compilation 302 with a search of a particular asset (e.g., the vehicle identified by the VIN of the asset identification data 306) and/or allow for the address compilation 302 to be searchable by the asset identification data 306. The asset identification data 306 is depicted in FIG. 3 as being optional because the asset identification data 306 may be included as one or more attributes in the address records 304.

As also depicted in FIG. 3, the address compilation 302 may optionally include asset monitoring data 312. The asset monitoring data 312 may include various fields $314_1$, $314_2$, ..., $314_P$, with each field including monitoring data for the asset (e.g., a first status flag indicating whether the asset has been found, a status flag indicating addresses are being sent as suggestions for locating the asset, one or more indications as to which addresses have been suggested and/or to which users have been suggested for the addresses, etc.). The asset monitoring data 312 is depicted in FIG. 3 as being optional because the asset monitoring data 312 may be stored separately from the address compilation 302. When stored separately from the address compilation 302, the asset monitoring data 312 may include additional monitoring data not shown in FIG. 3 (e.g., a field with a link to the address compilation 302; one or more fields with identifying information for the asset, so a database of address compilations can be searched by the identifying information; a field with a link to an asset inspection log that keeps a record of data associated with inspections of addresses for assets including messages sent to and received from users that conduct inspections; etc.).

Figure 4:
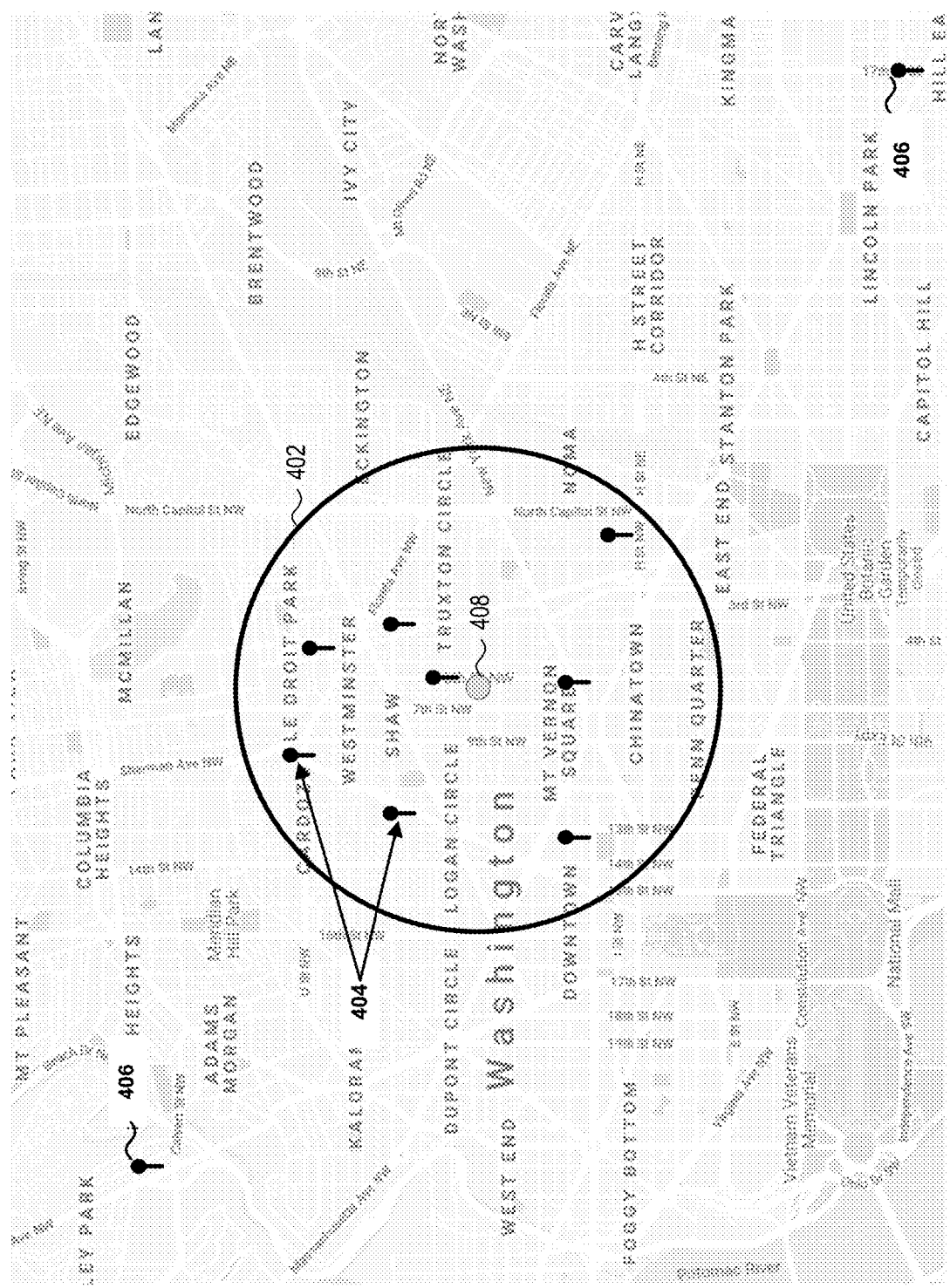
FIG. 4 is a map used to explain various aspects of the disclosure.

Continuing with our example relating to determining an address of a vehicle subject to a loan, the service platform 208 may compile address records 302 from various data sources (e.g., databases 202 or search services 204). After processing the compiled address records 302 (e.g., de-duplicating records, removing improper data, etc.), there may be a number of different records remaining. FIG. 4 depicts this situation with the compiled addresses indicated on a map by map pins. Based on compiled address records 302, service platform 208 may determine a zone of interest 402 based on the locations of the various compiled addresses. This can be accomplished by, for example, determining a center point 408 of the compiled address records 302 and determining the zone to be a pre-determined distance from that center point 408. In some instances outlying addresses (e.g., distant addresses 406) may be ignored or discarded for the purposes of determining the zone of interest 402. At any rate, it should be understood that all of the compiled addresses need not fall within the zone of interest 402.

After determining the zone of interest 402, the service platform 208 may prioritize the addresses based on, at least in part, their location within the zone of interest 402, their distance from the center of the zone of interest 402, various attributes (e.g., recency, source, etc.) of the addresses, to name a few non-limiting examples. After the prioritization, a subset (e.g., subset 404) of addresses can be determined and this subset of addresses can be sent to one or more of the service providers 206. The service providers 206 may then use the addresses they receive to confirm the location of the asset. For example, in some instances, service providers may use their received addresses to send an investigator to that address to determine whether the asset is located at the address.

Returning to our vehicle example, the service providers 206 who receive the subset of addresses 404, may physically travel to the subset of addresses and determine whether the automobile is located there. The result of that determination can then be sent back to the service platform 208. In the event that the address can be confirmed, the address is verified and no further addresses need to be investigated. However, if addresses in the subset cannot be verified, then this can be reported back to service platform 208, which can then update priority and the subset 404 based on the received report and transmit a new subset to one or more service providers. In this way, the addresses can be investigated such that the most likely addresses are investigated first. Additionally, according to some embodiments, it is also possible for the service platform 208 to send an updated or new subset of addresses to one or more service providers 206 after a pre-determined time has elapsed (e.g., several days with no information relating to the subset) even if updated information regarding the first subset has not been received from the service providers.

Figure 5:
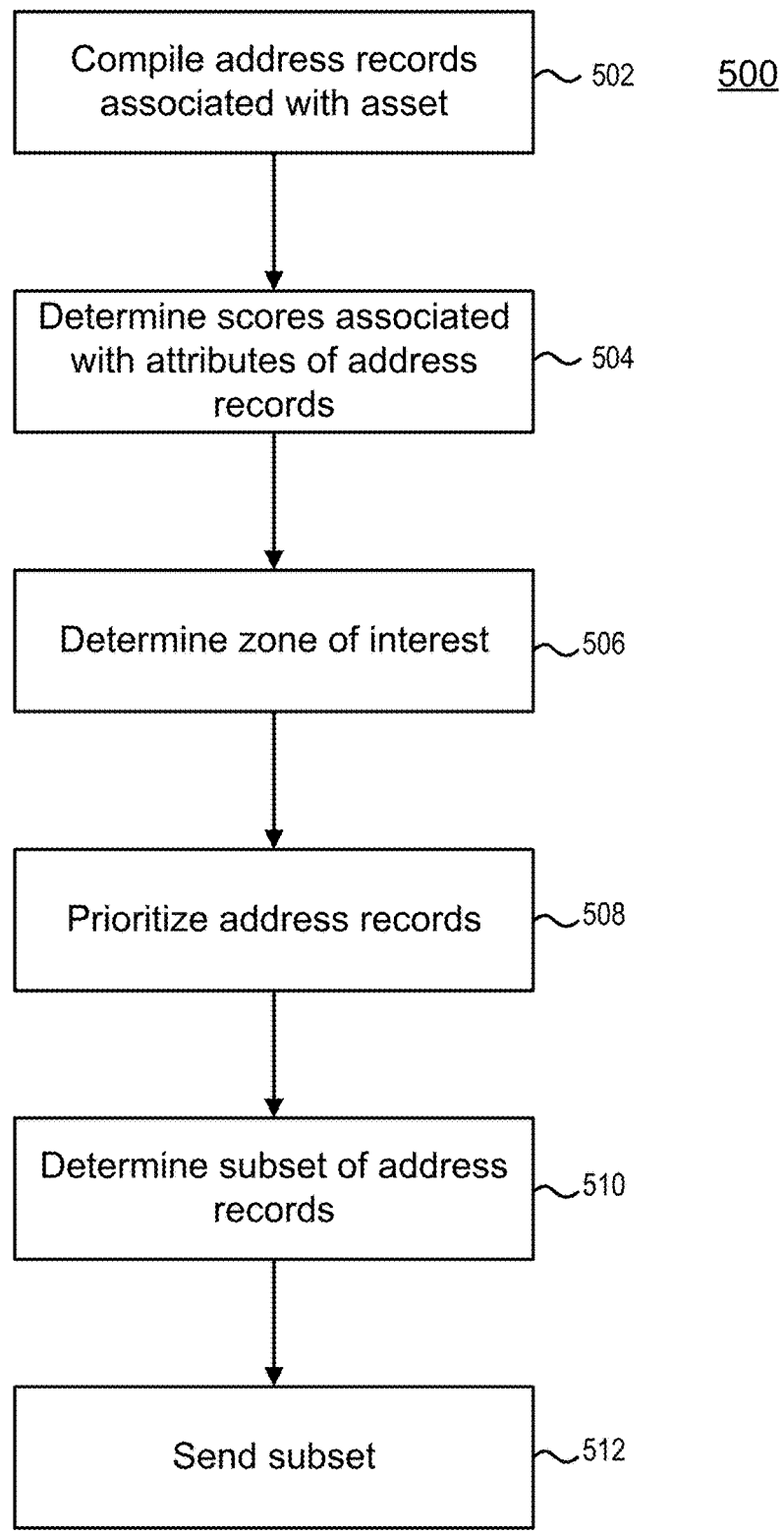
FIG. 5 is a flowchart depicting a method that may be used in accordance with one or more illustrative aspects described herein.

FIG. 5 is a flowchart depicting method 500, which may be practiced according to various aspects of this disclosure. For ease of explanation, FIG. 5 will be described with respect to FIGS. 1-4. However, it should be understood that this is just by way of example and that method 500 should not be understood to be limited to any of the specific embodiments described or shown in FIGS. 1-4.

As shown in FIG. 5, method 500 begins at 502, where address records associated with an asset are compiled by, e.g., the service platform 208. The address records may be the result of queries sent to a database (e.g., database 202), which may contain, among other things, information relating to a customer's digital activity. For example, database 202 may contain transaction data (including address/location information) of recent credit/debit card transactions. Additionally, database 202 may contain address information relating to loan applications, co-signers, employment address information or the like. The service platform may also query one or more search services 204 to compile additional addresses. This kind of address information may include credit bureau files, motor vehicle registration information, driver's license information, the address of relatives, voter registration, police reports, addresses of past vehicle servicing history, and license plate recognition data, etc.

After generating the address compilation 302, at 504 the service platform 208 may determine and/or generate scores associated with the various compiled addresses 302. The scores may be generated or determined by various attributes 308 associated with each of the address records. For example, address records with attributes 308 indicating that the address relates to a customer's home or work may be given a higher score than address records 304 with attributes 308 indicating that they relate to a different kind of location. Similarly, records with attributes 308 indicating that the record is more recent may be given a higher score than less recent records 304.

At 506, the service platform may determine a zone of interest 402 based, at least in part, on the location of the compiled address records 308. In some embodiments, the zone of interest may be determined by finding a center point 408 of the compiled address records and defining the zone of interest 402 to be a certain radius or distance from the center point 408. In some embodiments, outlying address records 304 (e.g., anomalous address records 304 or address records 304 very distant from the majority of the compiled address records 302) may be discarded or ignored for the purpose of determining the zone of interest 402. In some instances the zone of interest 402 may also be defined by, for example, curve fitting to create a geographical zone around the compiled address records 302.

At 508, the address records 302 can be prioritized. According to various embodiments, the address records 302 can be prioritized according to a combination of the scores that have been generated for them and their relationship to the zone of interest 402. For example, recent address records 304 could be given a higher priority than older address records 304. Similarly, address records 304 located within a zone of interest 402 could be given a higher priority than address records 304 located outside of the zone of interest 402. Furthermore, even within the zone of interest, address records 304 may be differently prioritized based on their relationship to the zone of interest 402. For example, address records closer to a center point 408 of the zone of interest 402 may be given a higher priority than address records 304 further away from the center point 408. According to various embodiments, schema for prioritizing address records may be defined with any number of priority levels. For example, address records could be prioritized according to the schema indicated in the following table:

TABLE 1

| Priority Level | High Priority | Low Priority |
| --- | --- | --- |
| 1 | Inside Zone of interest | Outside zone of interest |
| 2 | More recent | Less recent |
| 3 | Closer to center point | Further away from center point |
| 4 | Received from trusted source | Received from less trusted source |
| 5 | Residential address | Commercial address |

With this schema, address records 304 could be first prioritized by whether they fall within the zone of interest 402 or not. Next, further priority sorting may occur based on a recency of the address record (i.e., address information collected recently could be prioritized over older address information). Next, according to this example schema, a proximity to center point 408 could be prioritized over address records that are located further away from the center point 408. Similarly, the source of address record information may be considered in the priority—for example, it might be determined that address record information relating to a digital activity footprint of a customer based on their credit/debit card usage is more trusted than credit report information. This can be factored into the priority, as shown in the above table. Additionally, a preference for the kind of address (i.e., residential, commercial, etc.) may be factored into the priority at level 5, as shown above. To give an example of how priority can be determined, consider address records with the attributes shown in following table:

TABLE 2

| Rec. ST # | Within zone? | Distance from center | Recency | Source | Address type |
| --- | --- | --- | --- | --- | --- |
| 1 | No | 100 km | 2 weeks | Trusted | Commercial |
| 2 | Yes | 5 km | <1 week | Trusted | Residential |
| 3 | Yes | 10 km | 3 weeks | Trusted | Residential |
| 4 | No | 25 km | 3 weeks | Not trusted | Commercial |
| 5 | Yes | 7 km | 2 weeks | Trusted | Commercial |

By applying the priority schema defined in TABLE 1 to the records listed in TABLE 2, the address record priority shown in TABLE 3 (below) is reached.

TABLE 3

| Priority | Rec. # | Within zone? | Distance from center | Recency | Source | Address type |
| --- | --- | --- | --- | --- | --- | --- |
| 1 | 2 | Yes | 5 km | <1 week | Trusted | Residential |
| 2 | 5 | Yes | 7 km | 2 weeks | Trusted | Commercial |

TABLE 3-continued

| Priority | Rec. # | Within zone? | Distance from center | Recency | Source | Address type |
| --- | --- | --- | --- | --- | --- | --- |
| 3 | 3 | Yes | 10 km | 3 weeks | Trusted | Residential |
| 4 | 4 | No | 25 km | 3 weeks | Not trusted | Commercial |
| 5 | 1 | No | 100 km | 2 weeks | Trusted | Commercial |

At 510, a subset of address records (e.g., 404) may be determined based on determined priority. In some embodiments, this subset may comprise the top X number of address records (for instance, say the top two or three address records 302 by priority) based on the prioritization. It is also possible according to various embodiments, for all of the address records that meet certain criteria (e.g., all of the address records that are within the zone of interest and less than 1 week old) to be included in the subset of address records 404. At 512, the method 500 can send the subset of address records 404 to one or more service providers 206 for verification of the address.

The address record priority, shown in TABLE 3 (above), may be interchangeably referred herein as priority of address records, address priority data, and the like. Further, the address record priority may be stored in a database. The record number in the second column of TABLE 4 may be a stand in for the actual address record data (e.g., record #2 of the below table may be fields for one of the address records 304 as depicted in FIG. 3) and/or may be link to a location at which the address record is stored (e.g., record 2 may be a link to where one of the address records 304 is stored). Further, the address record priority may be stored as a variation of the address records 304 depicted in FIG. 3. For example, the data shown in columns 1 and 2-6 of TABLE 3 may be stored as fields in address records 304. By storing actual address record data, storing links to where the address records are stored, and/or by being stored as a variation of the address records 304 of FIG. 3, the address record priority may be associated with asset identification data 306 and/or asset monitoring data 312, as also depicted in FIG. 3.

Figure 6:
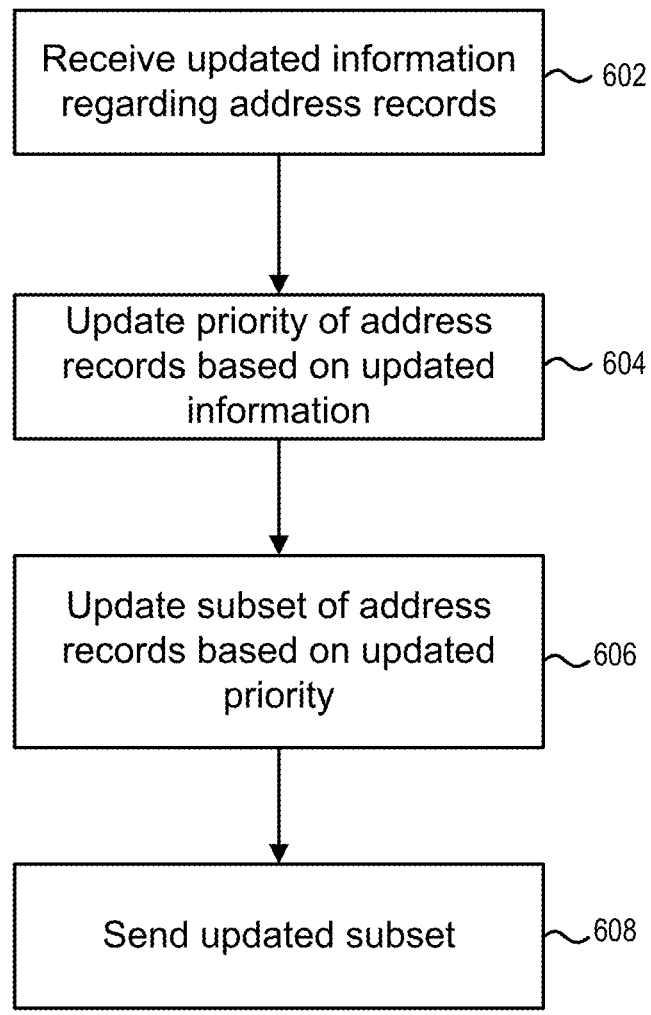
FIG. 6 is a flowchart depicting a method that may be used in accordance with one or more illustrative aspects described herein.

As previously alluded to, after service providers 206 receive the subset of address records 404, they can send updated information regarding the address records 404 to service platform 208. This process 600 is depicted in FIG. 6, which may be practiced according to various aspects of this disclosure. For ease of explanation, FIG. 6 will be described with respect to FIGS. 1-6. However, it should be understood that this is just by way of example and that method 600 should not be understood to be limited to any of the specific embodiments described or shown in FIGS. 1-6.

As shown in FIG. 6, method 600 begins when the service platform 208 receives updated information from, for example, one or more service providers 206 concerning one or more address records 304 in the subset of address records 404. For example, consider an example using the address records defined by TABLEs 2 and 3, above, sorted according to the priority schema defined in TABLE 1, above. Further consider that the initial subset 404 that was sent to the service providers 206 constituted the two highest priority address records—i.e., record numbers 2 and 5 as shown in TABLE 3, above. At step 602, the method 600 may receive updated information that records 2 and 5 are not accurate.

Thus, at 604, the priority of address records could be updated to place records 2 and 5 at the lowest priority (as shown in TABLE 4, below). In this way, records 2 and 5 may be deprioritized.

TABLE 4

| Priority | Rec. # | Within zone? | Distance from center | Recency | Source | Address type |
|---|---|---|---|---|---|---|
| 1 | 3 | Yes | 10 km | 3 weeks | Trusted | Residential |
| 2 | 4 | No | 25 km | 3 weeks | Not trusted | Commercial |
| 3 | 1 | No | 100 km | 2 weeks | Trusted | Commercial |
| 4 | 2 | Yes | 5 km | <1 week | Trusted | Residential |
| 5 | 5 | Yes | 7 km | 2 weeks | Trusted | Commercial |

In some instances, address records that are found to be inaccurate may be deleted entirely from consideration rather than being deprioritized. At any rate, at 606, method 600 updates the subset of records based on the updated priority. Continuing with our example, in this case the subset would be updated to delete records 2 and 5 from the subset and to add the new highest priority address records 3 and 4. At 608, the updated subset 404 can be sent to the one or more service providers 206.

As noted above, in some embodiments, service platform 208 may update the subset after a pre-determined amount of time has elapsed. For example, it may be determined that if no updated information about address records 404 is received within 3 days, that additional (albeit lower priority) addresses should be sent to one or more service providers for attempted verification. This process is described with respect to FIG. 7.

Figure 7:
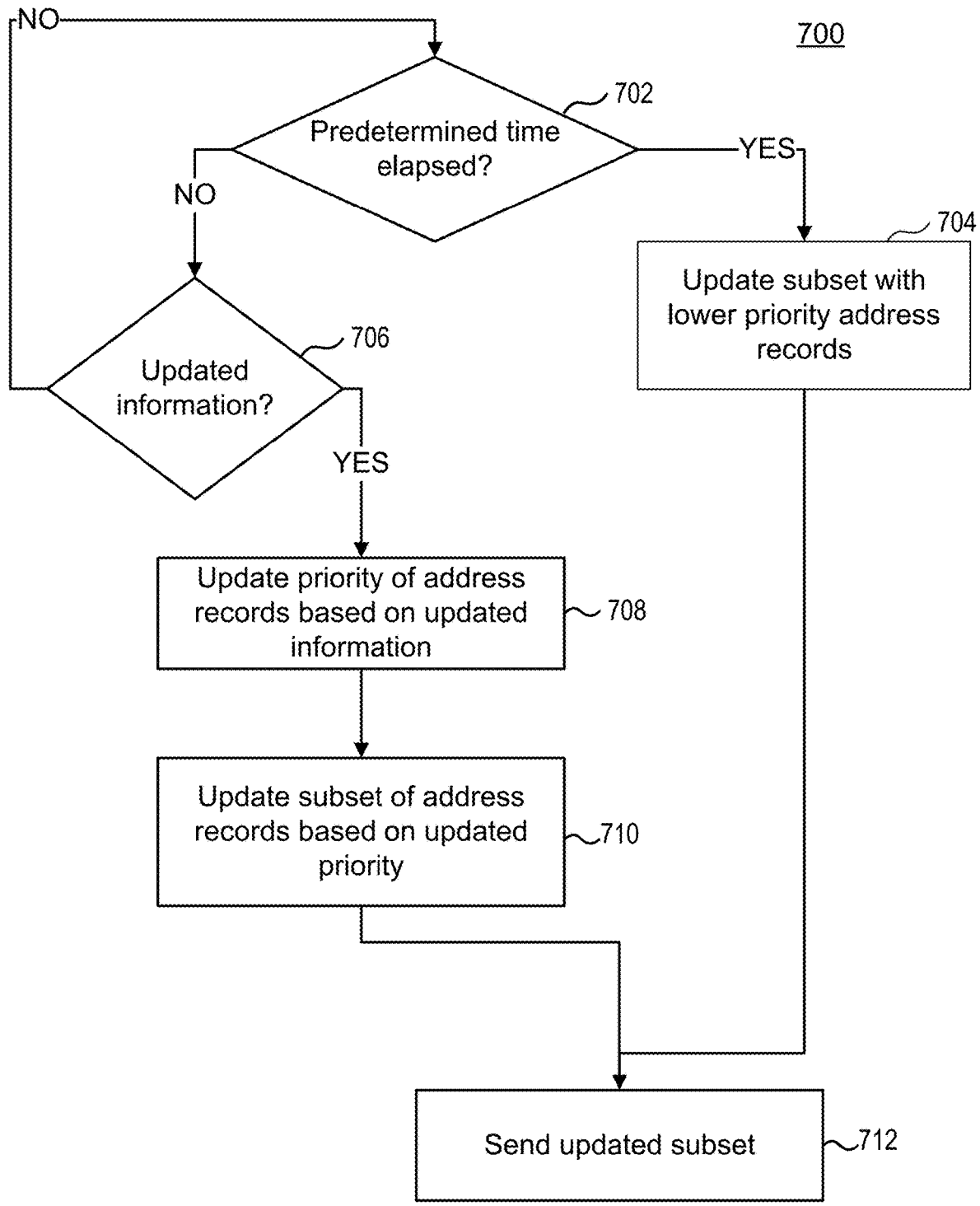
FIG. 7 is a flowchart depicting a method that may be used in accordance with one or more illustrative aspects described herein.

FIG. 7 is a flowchart depicting method 700, which may be practiced according to various aspects of this disclosure. For ease of explanation, FIG. 7 will be described with respect to FIGS. 1-6. However, it should be understood that this is just by way of example and that method 500 should not be understood to be limited to any of the specific embodiments described or shown in FIGS. 1-6.

As shown in FIG. 7, the method 700 determines whether a predetermined time (e.g., 3 days, a week, 2 weeks, etc.) has elapsed since a previous subset (e.g., subset 404) has been sent to one or more service providers 206. If the predetermined amount of time has elapsed, then, at 704, the subset is updated to include lower priority address records and that updated subset is sent to one or more service providers 206 at 712.

If, however, at 702, it is determined that the predetermined time has not elapsed, then method 700 can determine whether any updated information regarding the address records in the subset 404 has been received at 706. If no additional or updated information has been received at 706, then the method 700 can branch back to the beginning. If, however, updated information has been received then the method 700 can proceed to update the priority of address records 304 based on the received updated information at 708. This could be performed, for example, in accordance with method 600 described in FIG. 6, above.

Once the priority of the address records 304 has been updated, then the subset 404 can be updated based on the updated priority at 710. For example, if the top priorities are changed based on the updated information, then the new higher priority address records 304 can be included in the subset 404. It is also possible that, where prior members of the subset have declined in priority, those members can be removed from the updated subset. Once the subset is updated at 710, the updated subset can be sent to one or more service providers at 712.

In view of the above, a customer's digital activity may be used as a basis to determine address priority data and, based on the address priority data, send a subset of addresses so that the subset of addresses can be visited to inspect, search, or otherwise identify, the physical presence of an asset. FIGS. 8-14 depict additional features that, among other features, allow natural language processing techniques to be applied to messages received in association with the visits to inspect, search, or otherwise identify, the physical presence of the asset. For simplicity, inspecting, searching, or otherwise identifying, the physical presence of an asset will be referred to below as an inspection for an asset.

Figure 8:
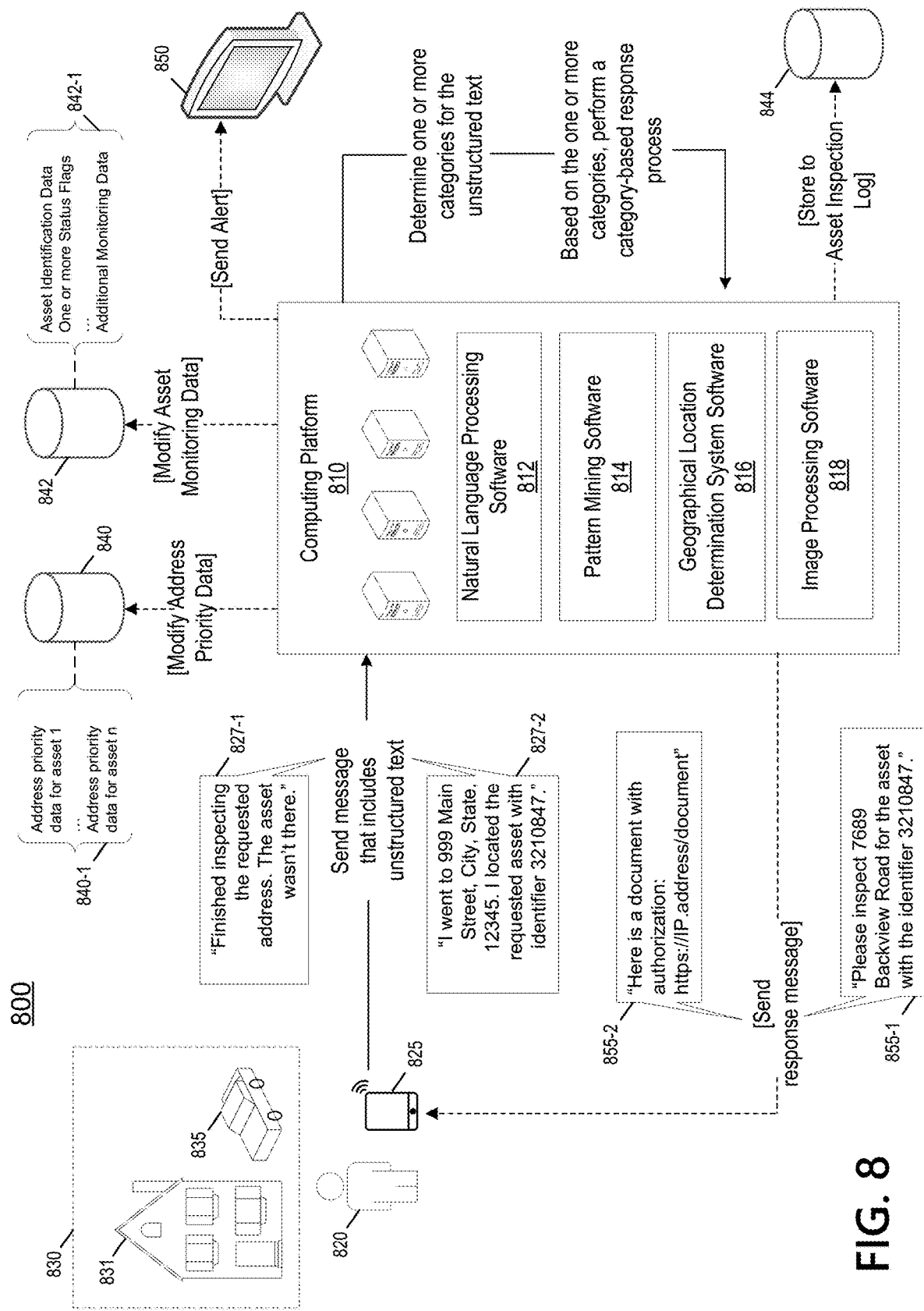
FIG. 8 is block diagram of a system in accordance with various aspects of the disclosure.

FIG. 8 depicts a block diagram of an example computing environment 800 that may be configured to, among other features, apply natural language processing techniques to messages received in association with an inspection for an asset. As a brief overview, the example computing environment 800 includes a computing platform 810 that may receive one or more messages associated with an inspection, by a user 820, of an address 830 for an asset, such as vehicle 835. Based on the message, the computing platform 810 may perform various processes and these various processes may involve communicating with other components of the example computing environment 800. As depicted, the other components include a user computing device 825, a back-end user computing device 850, and databases 840, 842, 844 that store data such as address priority data, asset monitoring data, and an asset inspection log. The three databases 840, 842, 844 are depicted as separate databases for simplicity. The data stored by the databases 840, 842, 844 may be stored in one or more databases.

The example computing environment 800 depicts an example where the user 820 is inspecting or has inspected address 830, which is depicted as a street address having premises 831, for vehicle 835. The user 820 may have been instructed to inspect the address 830 by an earlier message sent from the computing platform 810 to the user computing device 825 (e.g., instructed based on the sending of a subset of address records, as described in connection with FIGS. 5 and 6). In this way, the computing platform 810, along with other components depicted in the example computing environment 800, may be configured to prioritize addresses for inspection (e.g., as described above in connection with FIGS. 1-6), monitor the status of the inspections, and respond to messages received from users that are to perform the inspections. Further, the computing platform 810 may be operated by an entity, such as a bank, that contracts with the user 820 to inspect addresses for assets. As one example, the bank may have loaned a customer funds to purchase vehicle 835 and, based on non-payment of the loan, the bank may contract with the user 820 to locate the vehicle 835. The address 830 may be the home address of the customer or a business address of the customer.

Based on that inspection, the user 820 may input, via user computing device 825, unstructured text indicating whether the vehicle 835 was found by the inspection. The user computing device 825 may send the unstructured text, as a message, to the computing platform 810 via one or more networks (e.g., via a cellular network and the internet). The message may be in the form of a text message, an email, or some other suitable format for unstructured text. The user computing device 825 may be a mobile computing device such as a cellular phone, a tablet computer, a laptop computer, or the like. Allowing the user 820 to input and send unstructured text improves the user experience for those performing inspections. For example, the user 820 is able to input the unstructured text in a stylistic fashion that feels natural to them as opposed to internalizing limitations, and/or expectations, on format and content of input text.

The example computing environment 800 includes two examples 827-1, 827-2 of the unstructured text that may be input by the user 820 and included in the message sent to the computing platform 810. The first example 827-1 of the unstructured text indicates the vehicle 835 was not found: "Finished inspecting the requested address. The asset wasn't there." The second example 827-2 of the unstructured text indicates the vehicle 835 was found: "I went to 999 Main Street, City, State, 12345. I located the requested asset with identifier 3210847."

These two examples 827-1, 827-2 of the unstructured text show some of the challenges in processing unstructured text. As one example of the challenges in processing unstructured text, the first example 827-1 of the unstructured text does not explicitly include an indication of the address the user 820 inspected. In this way, the computing platform 810 may need to perform processes to determine which address the user 820 inspected. As further examples of the challenges in processing unstructured text, the second example 827-2 of the unstructured text includes various numbers that indicate different pieces of information. In particular, the second example 827-2 includes a street address (e.g., 999 Main Street, City, State 12345) having a street number (e.g., 999) and a zip code (e.g., 12345); and includes an identifier of the asset (e.g., 3210847), which may be a vehicle identification number (VIN) of vehicle 835. In view of the nature of unstructured text, these various numbers could be in a different order than depicted in the second example 827-2. For example, the identifier, 3210847, may come before the street number, 999, and/or before the zip code, 12345. In this way, the computing platform 810 may need to perform processes to accurately determine the information within unstructured text based on the condition that the pieces of information can be in any order.

To address these challenges, and others, the computing platform 810 may include one or more computing devices that execute software to process unstructured text and other data that may be included in the message. Indeed, as depicted in the example computing environment 800, the computing platform may execute natural language processing software 812, pattern mining software 814, geographical location determination system software 816, and image processing software 818.

Natural language processing software 812 may be configured to apply one or more natural language processing techniques to the unstructured text. The application of the one or more natural language processing techniques may analyze the unstructured text, segment the unstructured text, classify the unstructured text into one or more categories, and/or convert the unstructured text into a structured form that can be passed to other software being executed by the computing platform 810, such as by the pattern mining software 814. The natural language processing techniques may include various algorithms and model architectures that, for example, determine classifications (e.g., categories), word embeddings, word associations, word relevancy measurements, and/or word relevancy measurements. In this way, other software of the computing platform 810 may be configured to process the classifications, word embeddings, word associations, and/or word relevancy measurements determined by the natural language processing software 812. Examples of suitable algorithms and model architectures include Word2vec and term frequency-inverse document frequency (TF-IDF). Any model may be trained based on training data that includes a history of messages, or unstructured text, received from users that conducted inspections of addresses (e.g., two or more years of messages received from users that conducted inspections of addresses or two or more years of unstructured text received in messages from users that conducted inspections of addresses).

The pattern mining software 814 may be configured to apply one or more pattern mining techniques to extract, or otherwise determine, various pieces of information included in or indicated by the unstructured text. The pattern mining software 814 may be configured to receive data output by the natural language processing software 812. In particular, the pattern mining software 814 may receive the classifications, word embeddings, word associations, and/or word relevancy measurements from the natural language processing software 812. Based on this data, the pattern mining software 814 may extract, or otherwise determine, additional details included by or indicated by the unstructured text, such as address data (e.g., 999 Main Street, City, State, 12345); asset identification data (e.g., 3210847); or some other piece of data that may be expected to be included in unstructured text associated with inspections, such as inspection result data that indicates a result of an inspection of an address. The one or more pattern mining techniques may include sequential pattern mining algorithms, apriori algorithms, tree structure algorithms, and the like.

In some implementations, the pattern mining software 814 may be configured to perform a querying process to gather additional data from the user 820. For example, the pattern mining software 814 may be configured to determine that the unstructured text does not include particular pieces of information, such as the address or an asset identification. Based on this determination, the pattern mining software 814 may send a message requesting the information from the user 820. For example, if the first example 827-1 of the unstructured text was received, the pattern mining software 814 may be configured to determine that the unstructured text does not include the address (e.g., because the first example 827-1 does not explicitly include the street address 999 Main Street, City, State, 12345) and send one or more requests for the address to the user computing device 825. Responses to these requests may be sent to the natural language processing software 812 for processing and resulting data may be sent to the pattern mining software 814 as a way to continue determining various pieces of information included in or indicated by the unstructured text.

The geographical location determination system software 816 may be configured to gather, or otherwise access, address data, perform processes that prioritize addresses for inspection (e.g., as described above in connection with FIGS. 1-6), monitor the status of the inspections, and send and receive messages with users (e.g., user 820 and/or a user of back-end user computing device 850). In some implementations, the geographical location determination system software 816 may be configured to communicate with all other components of the example computing environment 800 to manage and cause performance of any of the features described throughout this disclosure.

While the example computing environment 800 provides an example of unstructured text being sent to the computing platform 810, the user 820 may cause other types of data to be sent to the computing platform 810. The computing platform 810 may include software that is configured to specifically process the other types of data. For example, the user 820 may, via a camera of the user computing device 825, take a picture of an asset if it has been found. This image may include a picture of the asset's identifier, such as a vehicle's VIN, which can often be seen through the bottom of the vehicle's windshield. To process the image data, the computing platform 810 may include image processing software 818. The image processing software 818 may process image data by applying one or more edge detection techniques, optical character recognition techniques, or any other image processing technique that is usable to identify pieces of information within an image, such as a VIN of a vehicle or some other asset identifier.

The example computing environment 800 introduces some of the processes performed by the computing platform 810 via the software 812-818. As depicted in FIG. 8, the computing platform 810, via software 812-818, may receive a message that includes the unstructured text, which was input by the user 820 in association with their inspection of the address 830. Based on receiving the message, the computing platform 810 may determine one or more categories for the unstructured text. The one or more categories may indicate the unstructured text is providing user feedback to the address 830, may indicate whether a response is required to be sent by the computing platform, or the like. Based on the one or more categories, the computing platform 810 may perform a category-based response process that includes customized steps for processing unstructured text of the determined one or more categories. In this way, the computing platform 810 may process messages received from users in different ways and depending on the unstructured text included in the message.

A category-based response process may include communicating with additional components of the example computing environment 800. For example and as depicted in FIG. 8, one or more category-based response processes may include modifying address priority data stored by database 840. Database 840 may store address priority data 840-1 for assets as a plurality of records or data structures. The address priority data 840-1 may be the same or similar to the records and data structures discussed in connection with TABLE 3. As one example, the address priority data 840-1 may be modified based on unstructured text that is categorized as providing user feedback to the address 830 and based on unstructured text indicating that the vehicle 835 was not found at the address 830.

One or more category-based response processes may include modifying asset monitoring data stored by database 842. Database 842 may store asset monitoring data 842-1 that is usable to monitor inspections for assets, such as asset identification data, one or more status flags, and any additional monitoring data that may be required. The asset monitoring data 842-1 may be the same or similar to the asset monitoring data 312 of FIG. 3 and may include asset identification data that is the same or similar to the asset identification data 306 of FIG. 3. As one example, the asset monitoring data 842-1 may be modified based on unstructured text that is categorized as providing user feedback to the address 830 and based on the unstructured text indicating that the vehicle 835 was found at the address 830.

One or more category-based response processes may include sending an alert to a back-end computing device 850. This alert may indicate to a user of the back-end computing device 850 that further action needs to be taken by a human before the computing platform is able to send a response to the user 820. For example, the alert may be associated with a suggested response that needs modification and/or approval by a user of the back-end computing device 850. As another example, the alert may be associated with a potential error in the inspection process that requires further action such as if the computing platform 810 has determined the asset is found at multiple addresses. For simplicity, a user of the back-end computing device 850 may be interchangeably referred herein as a back-end user.

The one or more category-based response processes may include adding, or otherwise storing, data to an asset inspection log, which may be stored by database 844. The asset inspection log may keep a history of all messages sent by users (e.g., user 820) in association with inspections for assets, a history of all messages sent by the computing platform 810 to users, a history of all actions taken by users of back-end computing devices (e.g., back-end computing device 850), and the like. The asset inspection log may be viewable on back-end computing devices. For example, the back-end computing device 850 may be configured to display a user interface that allows for the asset inspection log to be viewed, searched, browsed, and the like.

The one or more category-based response processes may include sending a response message from the computing platform 810 and to one or more user computing devices, such as user computing device 825. The response message may have been automatically generated by the computing platform 810 without any back-end user interaction. In this way, the user computing device 825 may receive a response message from the computing platform 810 in an automated fashion and that response message may include content that acts as a response to the unstructured text included in a message (e.g., message 827-1, 827-2) sent from the user computing device 825. An example where a response message may be sent to the user computing device 825 in an automated fashion is if the unstructured text includes an indication that the asset was not found at the address 830. In this example, the response message may include one or more additional addresses that the user 820 is suggested to inspect for the asset. The example computing environment 800 provides an example response message 855-1 that includes one or more additional addresses that the user 820 is suggested to inspect for the asset: "Please inspect 7689 Backview Road for the asset with the identifier 3210847." The response message may have been modified and/or approved by a user of the back-end computing device 850. One example of a response message that may have been modified and/or approved by a user of the back-end computing device 850 is if the unstructured text includes an indication that the asset was found at the address 830. In this example, the user of the back-end response message 850 may have verified that asset was found at the address 830 and verified that the user 820 is to be provided access to a document that authorizes the user 820 to take further action with the asset (e.g., authorization to initiate a seizure of the asset). As a result of those verifications, the response message may include a link that provides access to a document that authorizes the user 820 to take further action with the asset. The example computing environment 800 provides an example response message 855-2 that provides user 820 with access to a document that authorizes the user 820 to take further action with the asset: "Here is a document with authorization: https://IP.address/document". A response message may take the form of a text message, email, or other text-based format.

In view of the above discussion of FIG. 8, the example computing environment 800 provides an overview to the processes and components that allow for, among other features, the application of natural language processing techniques to messages received in association with an inspection for an asset. Additional details to some of the processes were discussed in connection with FIGS. 1-7 (e.g., the prioritization of addresses and the sending of subsets of the addresses). Further details—particularly those that relate to natural language processing, pattern mining, and image processing, and may serve to facilitate automated responses to unstructured text input by the user 820—are discussed below in connection with FIGS. 9-14.

Figure 9:
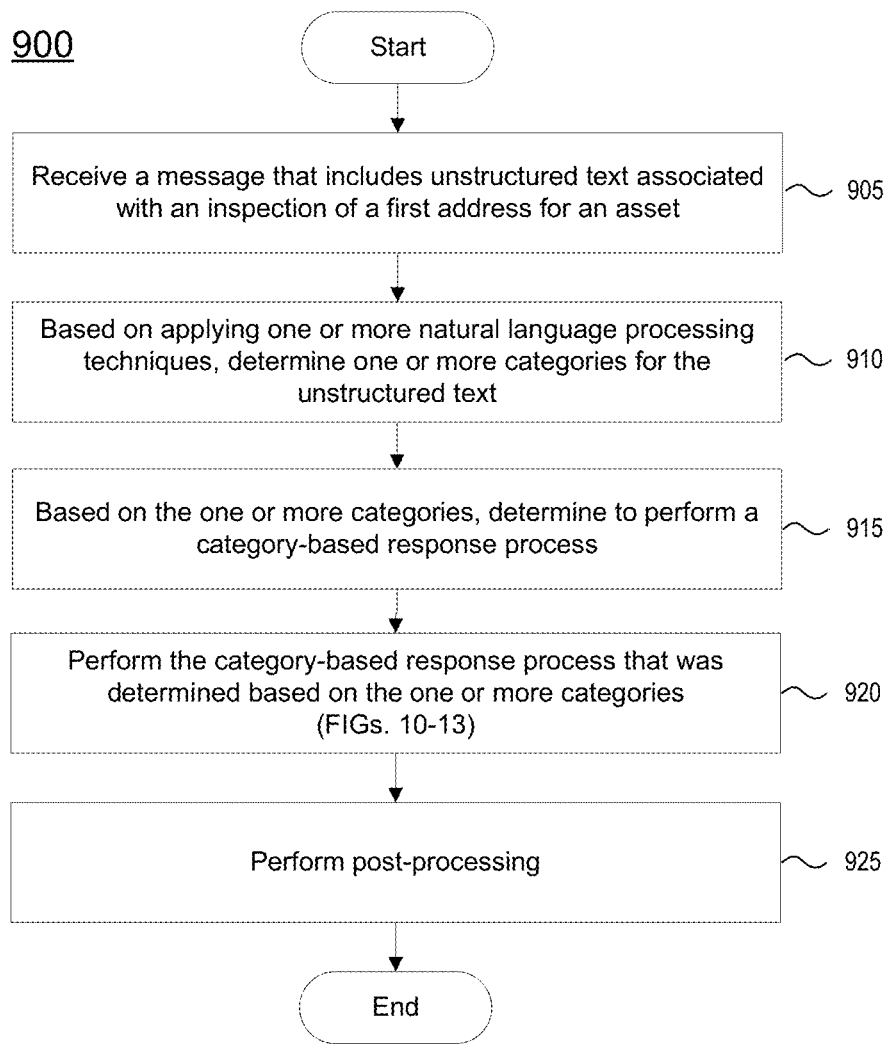
FIG. 9 is a flowchart depicting a method that may be used in accordance with one or more illustrative aspects described herein.
Figure 12:
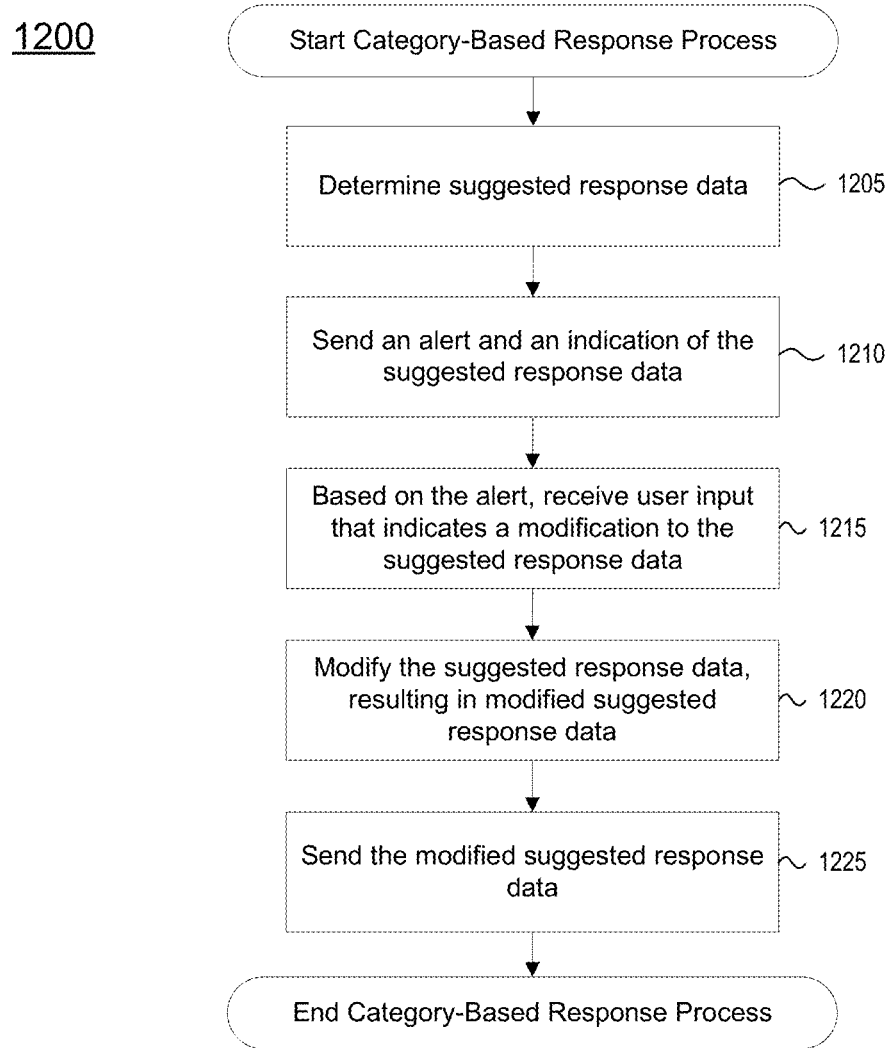
FIG. 12 is a flowchart depicting a method that may be used in accordance with one or more illustrative aspects described herein.
Figure 13:
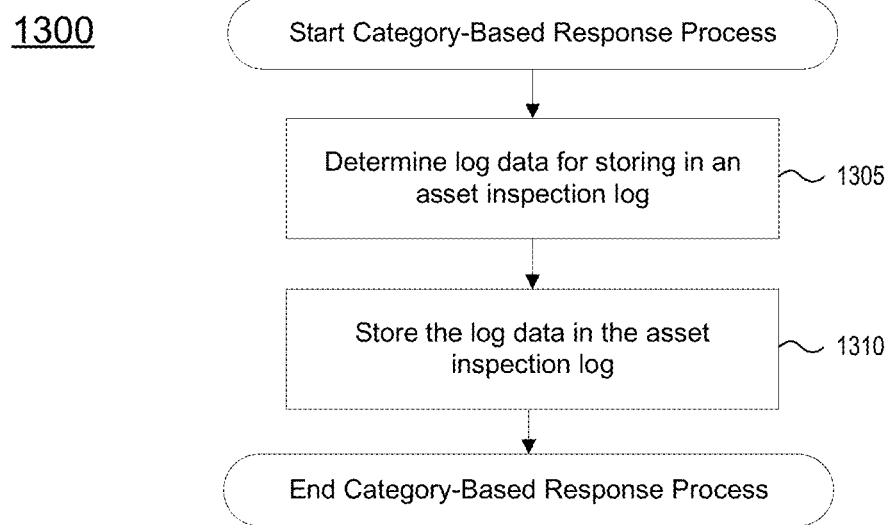
FIG. 13 is a flowchart depicting a method that may be used in accordance with one or more illustrative aspects described herein.
Figure 14:
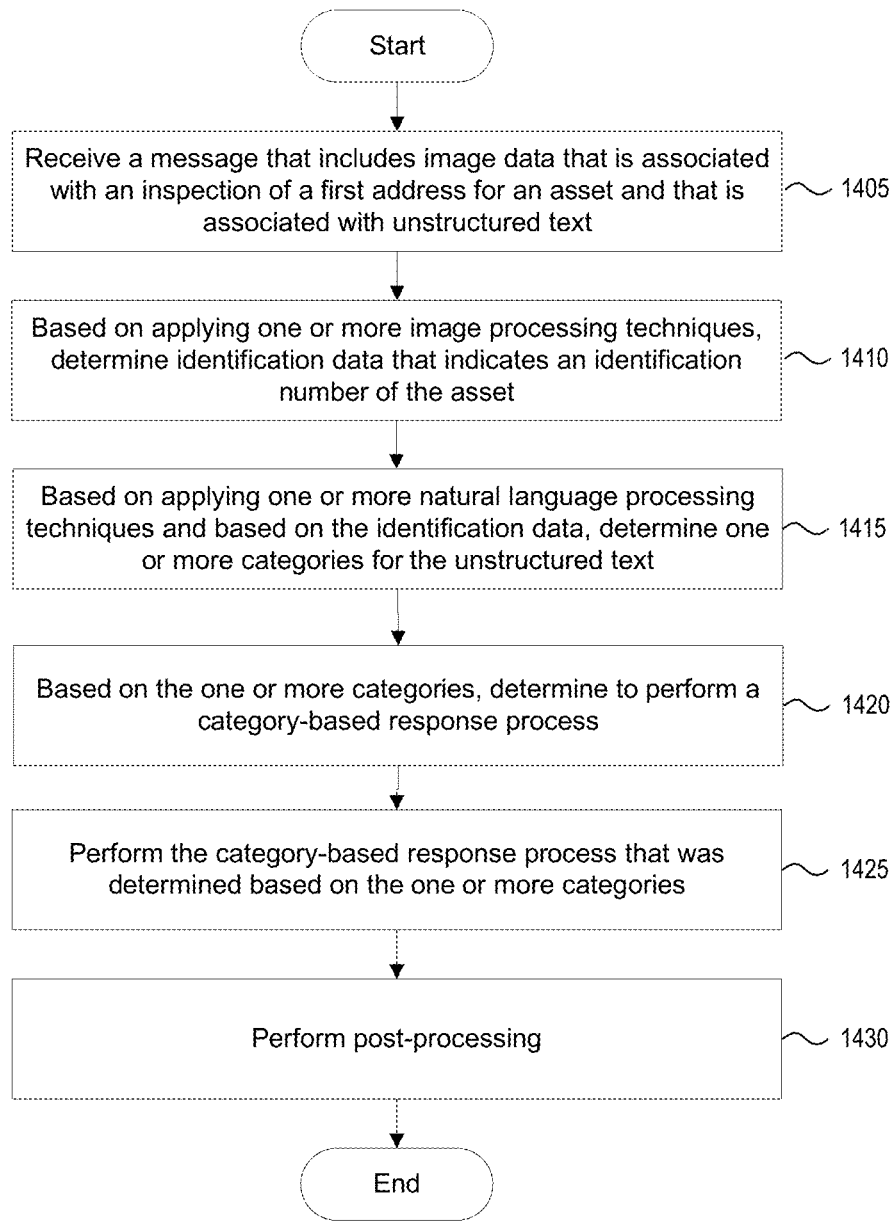
FIG. 14 is a flowchart depicting a method that may be used in accordance with one or more illustrative aspects described herein.

FIGS. 9-14 depict example methods that may be executed by the computing platform 810 of FIG. 8 or any other suitable computing devices. For simplicity, the example methods of FIGS. 9-14 will be discussed as being performed by one or more computing devices. FIGS. 9-14 depict example methods that may be used to process unstructured text and other data, determine one or more categories based on the unstructured text, and perform a category-based response process based on the one or more categories. The category-based response process includes customized steps that depend on the determined categories and may include the generation and sending of a response message in an automated fashion. In particular, FIG. 9 depicts an example method 900 that includes performing a category-based response process based on a message that includes unstructured text. FIGS. 10-13 depict example methods 1000, 1100, 1200, 1300 that represent different category-based responses processes for different categories. FIG. 14 depicts an example method 1400 that includes performing a category-based response process based on a message that includes image data.

Referring to FIG. 9, at step 905 of the example method 900, one or more computing devices may receive a message that includes unstructured text associated with an inspection of a first address for an asset. This message may be similar to the example messages 827-1, 827-2 described in connection with FIG. 8.

At step 910, the one or more computing devices may, based on applying one or more natural language processing techniques to the unstructured text, determine one or more categories for the unstructured text. The one or more natural language techniques may be the same as or similar to those discussed above in connection with the natural language processing software 812 of FIG. 8. Additionally, different types of categories may be determined. For example, the one or more computing devices may, for the unstructured text, determine two types of categories: a text description category as a first type of category and a text response category as a second type of category. The text description category may indicate a general description to the unstructured text. For example, the text description category may indicate whether the unstructured text is providing user feedback to an address (e.g., unstructured text input by the user 820 after inspecting address 830 for the asset 835 and indicating whether the asset was found), may indicate whether the unstructured text is or includes a query by a user in association with inspections for an asset, and/or may indicate whether the unstructured text is general information associated with inspections for an asset. The text response category may indicate whether a response is required to be sent by the one or more computing devices. TABLE 5 provides some examples of various categories that may be determined by the one or more computing devices based on applying one or more natural language processing techniques to the unstructured text. In particular, TABLE 5 includes different examples for text description categories and text response categories, examples of what the categories may indicate, and examples of unstructured text that may form the basis for determining the example categories.

TABLE 5

| Category Type | Indication Provided by the Category | Example Unstructured Text |
| --- | --- | --- |
| Text description category | Indication that the unstructured text provides user feedback to an address | "I went to 999 Main Street, City, State, 12345. I located the requested asset with identifier 3210847." |
| Text description category | Indication that the unstructured text includes a query | "Was the given address supposed to be an empty lot?" |
| Text description category | Indication that the unstructured text is general information associated with an inspection for an asset | "heading back to the address now to see if the vehicle is outside of the garage." |
| Text response category | Indication that a response is required to be sent | "Finished inspecting the requested address. The asset wasn't there." |
| Text response category | Indication that a response is not required to be sent | "Didn't find the asset at the first address, moving to the second address now." |

At step 915, the one or more computing devices may, based on the one or more categories, determine to perform a category-based response process. This determination may be based on a mapping that associates the one or more categories with category-based response processes. In this way, the one or more computing devices may determine which one of many category-based response processes may be performed based on the determined one or more categories. The mapping may include, for example, associations that map each potential combination of category types to a specific category-based response process. In this way, a combination of a text description category and a text response category may be mapped to a single category-based response process that is to be performed for that combination of categories. FIGS. 10-13 provide examples of different category-based response processes than may be performed for combinations of a text description category and a text response category.

At step 920, the one or more computing devices may perform the category-based response process that was determined based on the one or more categories. A category-based response process may include modifying address priority data, modifying asset monitoring data, sending an alert to a back-end computing device, storing to an asset inspection log, and/or sending a response message to a device (e.g., user computing device 825 of FIG. 8) associated with a user that input the unstructured text. Further details of performing a category-based response process are described below in connection with FIGS. 10-13.

At step 925, the one or more computing devices may perform post-processing. Post-processing may include collecting indications of response quality and/or storing data to a location so back-end users are able to further improve responses that are sent in an automated fashion. For example, the post-processing may include sending a query that asks if the previous response provided adequate information for the user conducting inspections to act further. If the user responds to the query in the affirmative, the post-processing may end. If the user responds to the query in the negative, the response sent to the user's device by the category-based response process may be collected and flagged as a response message that needs adjusting. As another example, the post-processing may include collecting data on an inspection for an asset (e.g., how many addresses have been inspected, how many messages have been sent by and/or received by the one or more computing devices in connection with inspections for the asset, how many days have elapsed since inspections for the asset began, and the like), and comparing the data to thresholds that if satisfied, would flag the inspection for the asset as one requiring further assistance (e.g., if at least 10 addresses have been inspected without finding the asset, flag the inspection, if at least 100 messages have been sent by and/or received by the one or more computing devices, flag the inspection, if 14 days have elapsed since inspections for the asset began and the asset has not yet been found, flag the inspection). Further, storing data to a location so back-end users are able to further improve responses that are sent in an automated fashion may optionally include storing the message received from the user, or just the unstructured text, as part of training data that can be used for training, or re-training, the models used as part of the pattern mining software 814.

Figure 10:
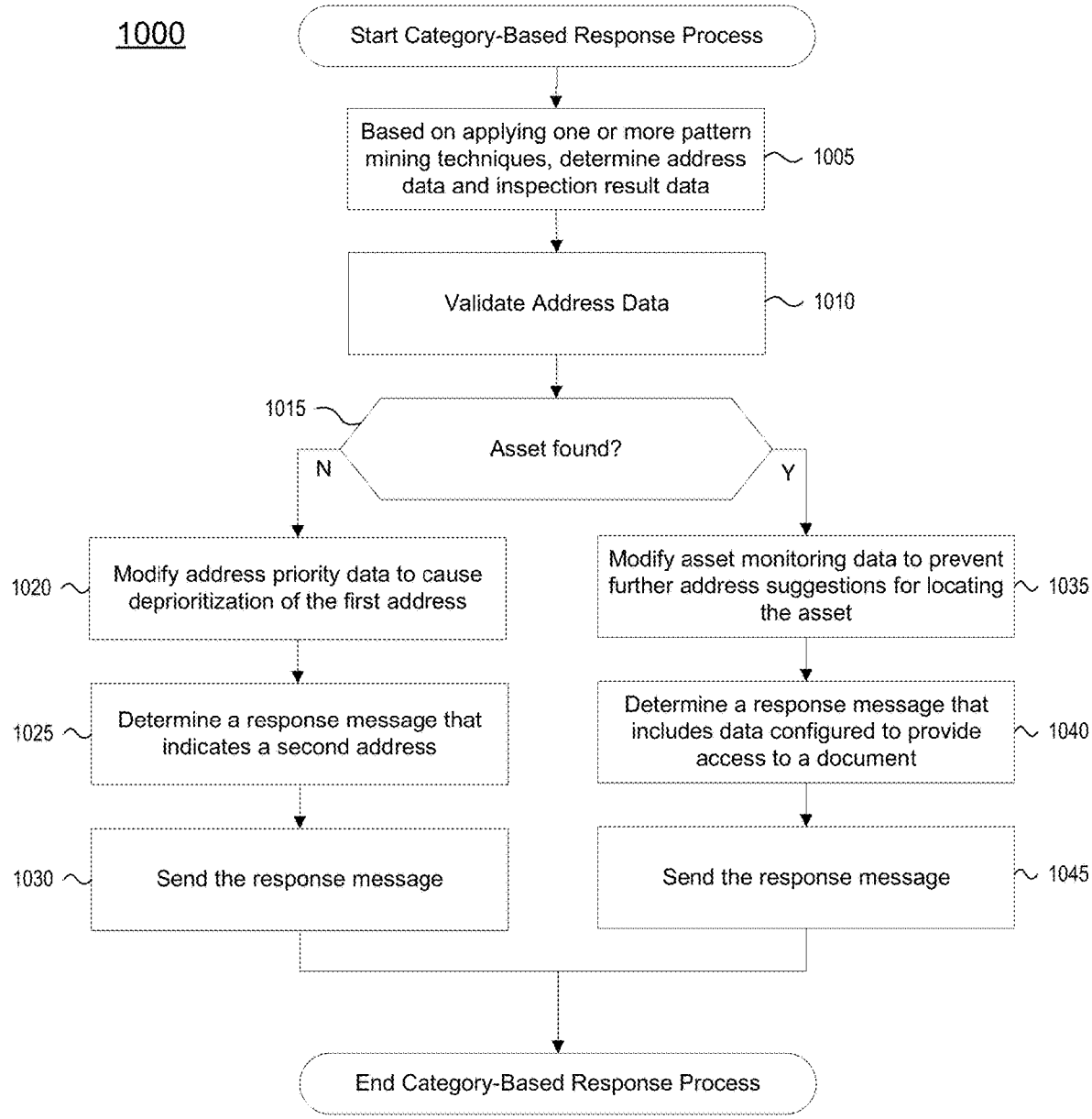
FIG. 10 is a flowchart depicting a method that may be used in accordance with one or more illustrative aspects described herein.
Figure 11:
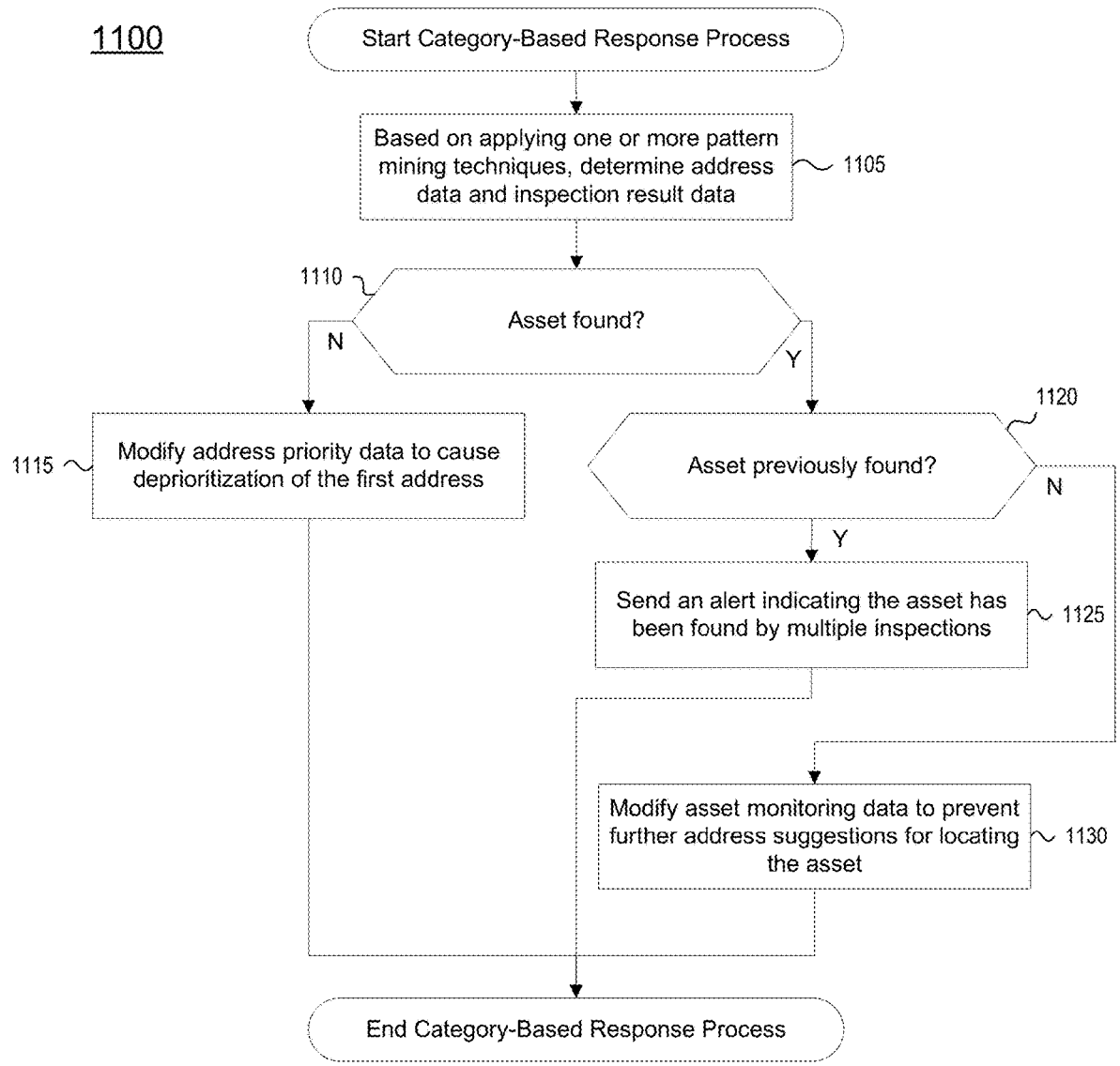
FIG. 11 is a flowchart depicting a method that may be used in accordance with one or more illustrative aspects described herein.

FIGS. 10-13 provide example methods of different category-based response processes. In particular, each of FIGS. 10-13 provides an example method for a category-based response process that may be performed based on a particular combination of a text description category and a text response category. FIG. 10 provides an example method 1000 for a first category-based response process that may be performed for a text description category that indicates the unstructured text provides user feedback to an address and a text response category that indicates a response is required to be sent. FIG. 11 provides an example method 1100 for a second category-based response process that may be performed for a text description category that indicates the unstructured text provides user feedback to an address and a text response category that indicates a response is not required to be sent. FIG. 12 provides an example method 1200 for a third category-based response process that may be performed for a text description category that indicates the unstructured text includes a query and a text response category that indicates a response is required to be sent. FIG. 13 provides an example method 1300 for a first category-based response process that may be performed for a text description category that indicates the unstructured text is general information associated with an inspection for an asset and a text response category that indicates a response is not required to be sent.

The examples provided by FIGS. 10-13 are not an exhaustive list of examples for category-based response processes. Other category-based response processes may be performed for different combination of categories. For example, a variation on the fourth example category-based response process of FIG. 13 could include the determination and sending of a response message based on a text description category that indicates the unstructured text is general information associated with an inspection for an asset and a text response category that indicates a response is required to be sent. Moreover, various steps of the examples depicted in FIGS. 10-13 may be omitted or combined to create different category-based response processes. For example, the steps of the fourth example category-based response process of FIG. 13 may be performed by every category-based response message. As another example, the validation of the address data performed by the first example category-based response process of FIG. 10 may be performed by the second example category-based response process of FIG. 11.

TABLE 6 provides a way to introduce the example method 1000 for a first category-based response process. TABLE 6 provides examples of unstructured text that could form the basis for performing the first category-based response process. In particular, TABLE 6 provides examples of unstructured text that may be categorized by a text description category that indicates the unstructured text provides user feedback to an address and a text response category that indicates a response is required to be sent. Based on this combination of categories, the first category-based response process may be performed.

TABLE 6

| Example Unstructured Text | Text Description Category | Text Response Category |
|---|---|---|
| "I went to 999 Main Street, City, State, 12345. I located the requested asset with identifier 3210847." | Text description category indicating the unstructured text provides user feedback to an address | Text response category indicating that a response is not required to be sent. |
| "Finished inspecting the requested address. The asset wasn't there." | Text description category indicating the unstructured text provides user feedback to an address | Text response category indicating that a response is not required to be sent. |
| "Provide me with another address for inspection." | Text description category indicating the unstructured text provides user feedback to an address | Text response category indicating that a response is not required to be sent. |

Referring to FIG. 10, at step 1005 of the example method 1000, the one or more computing devices may, based on applying one or more pattern mining techniques, determine address data and inspection result data for the unstructured text. The one or more pattern mining techniques may be the same as or similar to those discussed above in connection with the pattern mining software 814. The address data may indicate a first address that the unstructured text is associated with (e.g., address 830). The inspection result data may indicate one or more results of the inspection of the first address (e.g., an indication of whether the asset was found or not).

At step 1010, the one or more computing devices may validate the address data. Validating the address data may include validating that the zip code, as extracted for the address data by the one or more pattern mining techniques, is correct by comparing the zip code to known correct zip code data (e.g., compare the zip code to zip codes included in address records associated with the asset, such as the address priority data 840-1 of FIG. 8). If the zip code is not correct, the zip code may be corrected based on the known correct zip code data.

At step 1015, the one or more computing devices may determine whether the asset was found at the first address. This determination may be based on the inspection result data. For example, if the inspection result data indicates the asset was found, the method may proceed to perform steps 1035-1045. If the inspection result data indicates the asset was not found, the method may proceed to perform steps 1020-1030.

At step 1020, based on determining that the asset was not found at the first address, the one or more computing devices may modify address priority data to cause deprioritization of the first address. This may include modifying the address priority data so that the address record for the first address is given the least priority (e.g., move the address record for the first address to the bottom of the priority list and/or assign the address record with the least priority while increasing the priority of the other addresses). The asset priority data may be the same as or similar to the address priority data 840-1 of FIG. 8. Additionally, modifying the address priority data may include modifying one or more other fields of the address priority data. For example, any of the fields shown by TABLE 3 may be modified (e.g., if the address record for the first address indicates a source is untrusted, the field may be changed to trusted based on the unstructured text providing feedback from a user that inspected the first address).

At step 1025, the one or more computing devices may determine a response message that indicates a second address. This determination may be performed by determining at least a second address from the address priority data (e.g., the second address may be the one with the highest priority after deprioritizing the first address) and generating text that indicates the second address is suggested for inspection. In this way, the response message may include text that indicates a second address (e.g., response message 855-1 of FIG. 8). Further, this determination may be performed similar to how the subset of address records was updated at step 606 of FIG. 6.

At step 1030, the one or more computing devices may send the response message determined at step 1025. The response message may be sent to a device associated with the user that input the unstructured text (e.g., user computing device 825 of FIG. 8). The response message may take the form of a text message, email, or other text-based format.

At step 1035, based on determining that the asset was found at the first address, the one or more computing devices may modify asset monitoring data to prevent further address suggestions for locating the asset. This may include, for example, modifying one or more status flags in the asset monitoring data so that no further address suggestions are sent for locating the asset. The asset monitoring data may be the same as or similar to the asset monitoring data 842-1 of FIG. 8.

At step 1040, the one or more computing devices may determine a response message that includes data configured to provide access to a document (e.g., response message 855-2 of FIG. 8). The data may be a link to the document. The document may, for example, include authorization to take further action on the asset and access may be provided based on the asset being found by the user that input the unstructured text.

In some implementations, a back-end user may need to approve the inclusion of, or otherwise input, the data configured to provide access to a document. For example, at step 1040, the one or more computing devices may send an alert to a back-end computing device. The back-end user may, via a user interface, view the alert, input the data configured to provide access to the document, and cause the back-end computing device to send the data to the one or more computing devices as a response to the alert. Once the data is received, the response message may be configured to include the data input by the back-end user.

At step 1045, the one or more computing devices may send the response message determined at step 1040. The response message may be sent to a device associated with the user that input the unstructured text (e.g., user computing device 825 of FIG. 8). The response message may take the form of a text message, email, or other text-based format.

TABLE 7 provides a way to introduce the example method 1100 for a second category-based response process. TABLE 7 provides examples of unstructured text that could form the basis for performing the second category-based response process. In particular, TABLE 7 provides examples of unstructured text that may be categorized by a text description category that indicates the unstructured text provides user feedback to an address and a text response category that indicates a response is not required to be sent. Based on this combination of categories, the second category-based response message may be performed.

TABLE 7

| Example Unstructured Text | Text Description Category | Text Response Category |
| --- | --- | --- |
| "Didn't find the asset at the first address, moving to the second address now." | Text description category indicating the unstructured text provides user feedback to an address | Text response category indicating that a response is not required to be sent. |
| "I found the asset at the address yesterday, but it was in the garage. I am returning to the address today." | Text description category indicating the unstructured text provides user feedback to an address | Text response category indicating that a response is not required to be sent. |
| "The asset remains in the garage. I am waiting outside." | Text description category indicating the unstructured text provides user feedback to an address | Text response category indicating that a response is not required to be sent. |

Referring now to FIG. 11, at step 1105 of the example method 1100, the one or more computing devices may, based on applying one or more pattern mining techniques, determine address data and inspection result data for the unstructured text. The one or more pattern mining techniques may be the same as or similar to those discussed above in connection with the pattern mining software 814. The address data may indicate a first address that the unstructured text is associated with (e.g., address 830). The inspection result data may indicate one or more results of the inspection of the first address (e.g., an indication of whether the asset was found or not).

At step 1110, the one or more computing devices may determine whether the asset was found at the first address. This determination may be based on the inspection result data. For example, if the inspection result data indicates the asset was found, the method may proceed to perform one or more of steps 1120-1130. If the inspection result data indicates the asset was not found, the method may proceed to perform step 1115.

At step 1115, based on determining that the asset was not found, the one or more computing devices may modify address priority data to cause deprioritzation of the first address. This may be performed the same as or similar to the modification of the address priority data described above in connection with step 1020 of FIG. 10. The address priority data may be the same as or similar to the address priority data 840-1 of FIG. 8.

At step 1120, based on determining that the asset was found, the one or more computing devices may determine whether the asset was previously found by an earlier inspection. For example, asset monitoring data may be inspected to determine whether the asset has been previously found. This determination may be based on one or more status flags or some additional data of the address monitoring data. If the asset monitoring data indicates the asset has been previously found (e.g., a status flag indicates the asset has been found, a status flag indicates that address suggestions are no longer being sent, and/or additional data indicates the asset has been found), the method may proceed to perform step 1125. If the asset monitoring data indicates the asset has not been previously found (e.g., a status flag indicates the asset has not been found, a status flag indicates that address suggestions are being sent, and/or additional data indicates the asset has not been found), the method may proceed to perform step 1130.

At step 1125, based on determining that the asset was previously found, the one or more computing devices may send an alert indicating the asset has been found by multiple inspections. This alert may cause a back-end user to look more closely at the asset monitoring data (e.g., the asset monitoring data 842-1 of FIG. 8), address priority data (e.g., the address priority data 840-1 of FIG. 8), and/or the asset inspection log (e.g., the asset inspection log stored by database 844 of FIG. 8), determine if there is an error that needs correcting, and/or determine if users conducting inspections need to be contacted for clarification.

At step 1130, based on determining that the asset was not previously found, the one or more computing devices may modify asset monitoring data to prevent further address suggestions for locating the asset. This may be performed the same as or similar to the modification to the asset monitoring data described above in connection with step 1035 of FIG. 10.

TABLE 8 provides a way to introduce the example method 1200 for a third category-based response process. TABLE 8 provides examples of unstructured text that could form the basis for performing the third category-based response process. In particular, TABLE 8 provides examples of unstructured text that may be categorized by a text description category that indicates the unstructured text includes a query and a text response category that indicates a response is required to be sent. Based on this combination of categories, the third category-based response message may be performed.

TABLE 8

| Example Unstructured Text | Text Description Category | Text Response Category |
| --- | --- | --- |
| "Was the given address supposed to be an empty lot?" | Text description category indicating the unstructured text includes a query | Text response category indicating that a response is required to be sent. |
| "Is this address the work address of the customer?" | Text description category indicating the unstructured text includes a query | Text response category indicating that a response is required to be sent. |
| "What is the license plate of the vehicle?" | Text description category indicating the unstructured text includes a query | Text response category indicating that a response is required to be sent. |

Referring to FIG. 12, at step 1205, the one or more computing devices may determine suggested response data. The suggested response data may include text and/or data configured to provide access to one or more documents.

At step 1210, the one or more computing devices may send an alert and an indication of the suggested response data to a back-end computing device. The alert may indicate to a back-end user that the suggested response data is to be reviewed, modified, and/or approved.

At step 1215, the one or more computing devices may, based on the alert, receive user input that indicates a modification to the suggested response data. For example, the back-end user may have reviewed, via a user interface displaying the suggested response data, the suggested response data, decided to change the text of the suggested response data and/or to change the suggested response data such that a different document will be accessible (e.g., replace the link of the suggested response data to another link that provides access to a different document). The back-end user may, via the user interface, provide input that indicates the desired modifications to the suggested response data.

At step 1220, the one or more computing devices may modify the suggested response data, resulting in modified suggested response data. This modification may be performed in accordance with the user input received at step 1215, so that the modified suggested response data incorporates the back-end user's requested modifications.

At step 1225, the one or more computing devices may send the modified suggested response data. The modified suggested response message may be sent to a device associated with the user that input the unstructured text (e.g., user computing device 825 of FIG. 8). The modified suggested response message may take the form of a text message, email, or other text-based format.

TABLE 9 provides a way to introduce the example method 1200 for a third category-based response process. TABLE 9 provides examples of unstructured text that could form the basis for performing the fourth category-based response process. In particular, TABLE 9 provides examples of unstructured text that may be categorized by a text description category that indicates the unstructured text is general information associated with an inspection for an asset and a text response category that indicates a response is not required to be sent. Based on this combination of categories, the fourth category-based response message may be performed.

TABLE 9

| Example Unstructured Text | Text Description Category | Text Response Category |
| --- | --- | --- |
| "heading back to the address now to see if the vehicle is outside of the garage." | Text description category indicating the unstructured text is general information associated with an inspection for an asset | Text response category indicating that a response is not required to be sent. |
| "I'm leaving the address now." | Text description category indicating the unstructured text is general information associated with an inspection for an asset | Text response category indicating that a response is not required to be sent. |
| "I will need to return on a weekday. The building is closed." | Text description category indicating the unstructured text is general information associated with an inspection for an asset | Text response category indicating that a response is not required to be sent. |

Referring to FIG. 13, at step 1305, the one or more computing devices may determine log data for storing in the asset inspection log. This data may include messages received by the one or more computing devices, unstructured text input by users, response messages sent by the one or more computing devices, alerts sent to back-end computing devices, and any other data received, sent, determined, or generated by the one or more computing devices in processing unstructured text and/or performing a category-based response process. The asset inspection log may be the same as or similar to the asset inspection log discussed above in connection with database 844 of FIG. 8.

At step 1310, the one or more computing devices may store the log data in the asset inspection log. By storing log data in the asset inspection log, the log data may be searchable, browsable, and/or viewable by a back-end user. For example, a back-end user may be able to view a user interface that displays data stored in the asset inspection log for a particular asset. This data may be displayed at the same time as the user interface displays an alert and/or suggested response data. In this way, the back-end user may be able to view, for example, a history of messages sent and received by the one or more computing devices in association with inspections for the asset.

FIG. 14 depicts an example method 1400 that includes performing a category-based response process based on a message that includes image data. At step 1405 of the example method 1400, the one or more computing devices may receive a message that includes image data that is associated with an inspection of a first address for an asset and that is associated with unstructured text. The unstructured text may be included in the same message or may be included in another message received from the same user computing device as the message including the image data (e.g., the user may send a first message with unstructured text and may then follow up with a second message that includes the image data). The image data may be an image taken by the user with a camera during the inspection of the first address for the asset. For example, the user may have taken a picture of a vehicle's VIN after finding the vehicle during the inspection.

At step 1410, the one or more computing devices may, based on applying one or more image processing techniques to the image data, determine identification data. The identification data may indicate an identification number, or some other identifier, of the asset. The one or more image processing techniques may be the same as or similar to those discussed above in connection with the image processing software 818 of FIG. 8. Indeed, the one or more image processing techniques may include one or more edge detection techniques, optical character recognition techniques, or any other image processing technique that are usable to identify pieces of information within an image, such as a VIN of a vehicle or some other asset identifier. In this way, the identification data may indicate an identifier of an asset, such as the VIN of a vehicle.

At step 1415, the one or more computing devices may be based on applying one or more natural language processing techniques to the unstructured text and based on the identification data, determine one or more categories for the unstructured text. This determination may be performed similar to the determination described above in connection with step 910 of FIG. 9. This determination, however, is also performed based on the identification data determined based on the image data. In this way, the one or more categories may be determined based on the identification data. For example, if the identification data indicates a vehicle's VIN, the one or more computing devices may determine that the one or more categories include a text description category that indicates the unstructured text provides user feedback to an address.

At step 1420, the one or more computing devices may, based on the one or more categories, determine to perform a category-based response process. This determination may be performed the same as or similar to the determination described above in connection with step 915 of FIG. 9.

At step 1425, the one or more computing devices may perform the category-based response process that was determined based on the one or more categories. The category-based response process could be the same as or similar to those discussed above in connection with FIGS. 10-13. This category-based response process, however, may also include processing the identification data determined based on the image data. In this way, the category-based response process performed at step 1425 is performed based on the image data. For example, the category-based response process may be similar to the first example category-based response process described in connection with FIG. 10, but with further customization to process the inspection data. Continuing this example, when the one or more computing devices determine whether the asset was found, the one or more computing devices may make the determination based on the identification data. If the identification data indicates an identifier that matches a known correct identifier for the asset (e.g., the known correct identifier may be found in the address priority data and/or the asset monitoring data), the one or more computing devices may determine the asset was found. If the identification data indicates an identifier that does not match a known correct identifier for the asset, the one or more computing devices may determine the asset was not found.

At step 1430, the one or more computing devices may perform post-processing. This post-processing may be performed the same as or similar to the post-processing described above in connection with step 925 of FIG. 9.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by one or more computing devices, a first message that includes first unstructured text, wherein the first unstructured text was input by a first user and is associated with an inspection, by the first user, of a first address for a first asset;
based on applying one or more natural language processing techniques to the first unstructured text, determining, by the one or more computing devices, one or more categories for the first unstructured text; and
based on the one or more categories for the first unstructured text, performing, by the one or more computing devices, a first category-based response process that includes:
based on applying one or more pattern mining techniques to the first unstructured text, determining, by the one or more computing devices, address data that indicates the first address and inspection result data that indicates one or more results of the inspection of the first address, based on the inspection result data, determining, by the one or more computing devices, that the first asset was not found at the first address, based on the address data and the inspection result data, modifying, by the one or more computing devices, address priority data that indicates a prioritized order for conducting inspections of addresses to locate the first asset, wherein modifying the address priority data causes the first address to be deprioritized in the prioritized order of the addresses, determining, by the one or more computing devices, a response message that indicates, based on the address priority data, a second address at which the first user is suggested to conduct an inspection for the first asset, and sending, by the one or more computing devices, the response message to a device associated with the first user.

2. The method of claim 1, wherein the first asset is a vehicle associated with an owner;
wherein the first address is a first street address of a premises associated with the owner; and
wherein the second address is a second street address of a premises associated with the owner.

3. The method of claim 1 further comprising:
receiving, by the one or more computing devices, a second message that includes second unstructured text, wherein the second unstructured text was input by a second user and is associated with an inspection, by the second user, of a third address for a second asset;
based on applying the one or more natural language processing techniques to the second unstructured text, determining, by the one or more computing devices, one or more categories for the second unstructured text; and
based on the one or more categories for the second unstructured text, performing, by the one or more computing devices, a second category-based response process that includes:
based on applying the one or more pattern mining techniques to the second unstructured text, determining, by the one or more computing devices, additional address data that indicates the third address and additional inspection result data that indicates one or more results of the inspection of the third address,
based on the additional inspection result data, determining, by the one or more computing devices, that the second asset was found at the third address, and
modifying, by the one or more computing devices, asset monitoring data such that, based on the additional inspection result data, further addresses are prevented from being suggested for locating the second asset.

4. The method of claim 3, wherein the one or more pattern mining techniques include extracting, from the first unstructured text, identification data that indicates an identification number for the first asset and extracting, from the first unstructured text, the address data; and
wherein the inspection result data indicates, based on the identification data, that the first asset was found at the first address.

5. The method of claim 3, wherein the second category-based response process includes:
determining, by the one or more computing devices, an additional response message that provides access to a document associated with taking further action with the second asset; and
sending, by the one or more computing devices, the additional response message to a device associated with the second user.

6. The method of claim 1, wherein the one or more categories for the first unstructured text includes a text description category that indicates the first unstructured text is providing user feedback to the first address by the first user;
wherein the one or more categories for the first unstructured text includes a text response category that indicates a response is required to be sent; and
wherein the method further comprises based on the text description category and the text response category, determining, from a plurality of category-based response processes, to perform the first category-based response process.

7. The method of claim 6, wherein the first category-based response process is one of a plurality of category-based response processes, wherein each of the plurality of category-based response processes are configured to be performed based on a combination of categories.

8. The method of claim 1, wherein performing the first category-based response process includes:
based on a determination that the address data is not valid, modifying the address data based on a stored version of the first address.

9. The method of claim 1 further comprising:
receiving, by the one or more computing devices, a second message that includes second unstructured text, wherein the second unstructured text was input by a second user and is associated with an inspection, by the second user, of a third address for a second asset;
based on applying the one or more natural language processing techniques to the second unstructured text, determining, by the one or more computing devices, one or more categories for the second unstructured text; and
based on the one or more categories for the second unstructured text, performing, by the one or more computing devices, a second category-based response process that includes:
determining, by the one or more computing devices, suggested response data,
sending, by the one or more computing devices, an alert to a second user,
based on the alert, receiving, by the one or more computing devices, user input that indicates a modification to the suggested response data,
modifying, by the one or more computing devices, the suggested response data, resulting in modified suggested response data, and
sending, by the one or more computing devices, the modified suggested response data to a device associated with the second user.

10. The method of claim 1 further comprising:
receiving, by the one or more computing devices, a second message that includes image data, wherein the image data is associated with the inspection, by the first user, of the first address for the first asset;
based on applying one or more image processing techniques to the image data, determining, by the one or more computing devices, identification data that indicates an identification number of the first asset; and
wherein the inspection result data indicates the first asset was found at the first address based on the identification data.

11. An apparatus comprising:
one or more processors; and
memory storing executable instructions that, when executed by the one or more processors, cause the apparatus to:
receive a first message that includes first unstructured text, wherein the first unstructured text was input by a first user and is associated with an inspection, by the first user, of a first address for a first asset;
based on applying one or more natural language processing techniques to the first unstructured text, determine one or more categories for the first unstructured text; and
based on the one or more categories for the first unstructured text, perform a first category-based response process that includes:
based on applying one or more pattern mining techniques to the first unstructured text, determining address data that indicates the first address and inspection result data that indicates one or more results of the inspection of the first address,
based on the inspection result data, determining that the first asset was not found at the first address,
based on the address data and the inspection result data, modifying address priority data that indicates a prioritized order for conducting inspections of addresses to locate the first asset, wherein modifying the address priority data causes the first address to be deprioritized in the prioritized order of the addresses,
determining a response message that indicates, based on the address priority data, a second address at which the first user is suggested to conduct an inspection for the first asset, and
sending the response message to a device associated with the first user.

12. The apparatus of claim 11, wherein the first asset is a vehicle associated with an owner;
wherein the first address is a first street address of a premises associated with the owner; and
wherein the second address is a second street address of a premises associated with the owner.

13. The apparatus of claim 11, wherein the executable instructions, when executed by the one or more processors, cause the apparatus to:
receive a second message that includes second unstructured text, wherein the second unstructured text was input by a second user and is associated with an inspection, by the second user, of a third address for a second asset;
based on applying the one or more natural language processing techniques to the second unstructured text, determine one or more categories for the second unstructured text; and
based on the one or more categories for the second unstructured text, perform a second category-based response process that includes:
based on applying the one or more pattern mining techniques to the second unstructured text, determining additional address data that indicates the third address and additional inspection result data that indicates one or more results of the inspection of the third address,
based on the additional inspection result data, determining that the second asset was found at the third address, and
modifying asset monitoring data such that, based on the additional inspection result data, further addresses are prevented from being suggested for locating the second asset.

14. The apparatus of claim 11, wherein the one or more categories for the first unstructured text includes a text description category that indicates the first unstructured text is providing user feedback to the first address by the first user;
wherein the one or more categories for the first unstructured text includes a text response category that indicates a response is required to be sent; and
wherein the executable instructions, when executed by the one or more processors, cause the apparatus to, based on the text description category and the text response category, determine, from a plurality of category-based response processes, to perform the first category-based response process.

15. The apparatus of claim 11, wherein the executable instructions, when executed by the one or more processors, cause the apparatus to:
receive a second message that includes second unstructured text, wherein the second unstructured text was input by a second user and is associated with an inspection, by the second user, of a third address for a second asset;
based on applying the one or more natural language processing techniques to the second unstructured text, determine one or more categories for the second unstructured text; and
based on the one or more categories for the second unstructured text, perform a second category-based response process that includes:
determining suggested response data,
sending an alert to a second user,
based on the alert, receiving user input that indicates a modification to the suggested response data,
modifying the suggested response data, resulting in modified suggested response data, and
sending the modified suggested response data to a device associated with the second user.

16. The apparatus of claim 11, wherein the executable instructions, when executed by the one or more processors, cause the apparatus to:
receive a second message that includes image data, wherein the image data is associated with the inspection, by the first user, of the first address for the first asset;
based on applying one or more image processing techniques to the image data, determine identification data that indicates an identification number of the first asset; and
wherein the inspection result data indicates the first asset was found at the first address based on the identification data.

17. One or more non-transitory computer-readable media storing executable instructions that, when executed, cause one or more computing devices to:
receive a first message that includes first unstructured text, wherein the first unstructured text was input by a first user and is associated with an inspection, by the first user, of a first address for a first asset;

based on applying one or more natural language processing techniques to the first unstructured text, determine one or more categories for the first unstructured text; and based on the one or more categories for the first unstructured text, perform a first category-based response process that includes:
- based on applying one or more pattern mining techniques to the first unstructured text, determining address data that indicates the first address and inspection result data that indicates one or more results of the inspection of the first address,
- based on the inspection result data, determining that the first asset was not found at the first address,
- based on the address data and the inspection result data, modifying address priority data that indicates a prioritized order for conducting inspections of addresses to locate the first asset, wherein modifying the address priority data causes the first address to be deprioritized in the prioritized order of the addresses,
- determining a response message that indicates, based on the address priority data, a second address at which the first user is suggested to conduct an inspection for the first asset, and
- sending the response message to a device associated with the first user.

18. The one or more non-transitory computer-readable media of claim 17, wherein the first asset is a vehicle associated with an owner;
wherein the first address is a first street address of a premises associated with the owner; and
wherein the second address is a second street address of a premises associated with the owner.

19. The one or more non-transitory computer-readable media of claim 17, wherein the executable instructions, when executed, cause the one or more computing devices to:
receive a second message that includes second unstructured text, wherein the second unstructured text was input by a second user and is associated with an inspection, by the second user, of a third address for a second asset;

based on applying the one or more natural language processing techniques to the second unstructured text, determine one or more categories for the second unstructured text; and based on the one or more categories for the second unstructured text, perform a second category-based response process that includes:
- based on applying the one or more pattern mining techniques to the second unstructured text, determining additional address data that indicates the third address and additional inspection result data that indicates one or more results of the inspection of the third address,
- based on the additional inspection result data, determining that the second asset was found at the third address, and
- modifying asset monitoring data such that, based on the additional inspection result data, further addresses are prevented from being suggested for locating the second asset.

20. The one or more non-transitory computer-readable media of claim 17, wherein the executable instructions, when executed, cause the one or more computing devices to:
receive a second message that includes image data, wherein the image data is associated with the inspection, by the first user, of the first address for the first asset;

based on applying one or more image processing techniques to the image data, determine identification data that indicates an identification number of the first asset; and wherein the inspection result data indicates the first asset was found at the first address based on the identification data.

* * * * *